US010511991B2

United States Patent
Ma et al.

(10) Patent No.: US 10,511,991 B2
(45) Date of Patent: Dec. 17, 2019

(54) ADAPTING COMMUNICATION PARAMETERS TO LINK CONDITIONS, TRAFFIC TYPES, AND/OR PRIORITIES

(71) Applicant: VID SCALE, INC., Wilmington, DE (US)

(72) Inventors: Liangping Ma, San Diego, CA (US); Wei Chen, San Diego, CA (US); Gregory S. Sternberg, Mt. Laurel, NJ (US); Yuriy Reznik, Seattle, WA (US); Oghenekome Oteri, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 0 days.

(21) Appl. No.: 16/415,644

(22) Filed: May 17, 2019

(65) Prior Publication Data

US 2019/0274062 A1    Sep. 5, 2019

Related U.S. Application Data

(63) Continuation of application No. 15/515,865, filed as application No. PCT/US2015/054190 on Oct. 6, 2015, now Pat. No. 10,356,652.

(Continued)

(51) Int. Cl.
*H04W 28/02* (2009.01)
*H04L 12/851* (2013.01)
(Continued)

(52) U.S. Cl.
CPC ....... *H04W 28/0242* (2013.01); *H04L 1/0001* (2013.01); *H04L 1/0033* (2013.01);
(Continued)

(58) Field of Classification Search
CPC ........................ H04W 28/0242; H04L 47/24
(Continued)

(56) References Cited

U.S. PATENT DOCUMENTS 9,125,086 B2    9/2015  Okuyama
2003/0012167 A1  1/2003  Benveniste
(Continued)

FOREIGN PATENT DOCUMENTS

CN        1556629 A    12/2004
CN      103716123 A     4/2014
(Continued)

OTHER PUBLICATIONS

Acharya et al., "Congestion-Aware Rate Adaptation in Wireless Networks: A Measurement-Driven Approach", 5th Annual IEEE Communications Society Conference on Sensor, Mesh and Ad Hoc Communications and Networks, San Francisco, CA, 2008, pp. 1-9.

(Continued)

*Primary Examiner* — Angel T Brockman
(74) *Attorney, Agent, or Firm* — Condo Roccia Koptiw LLP

(57) ABSTRACT

Systems and methods are provided for adapting communication parameters to a variety of link conditions, traffic types and priorities. For example, WiFi transmission parameters (e.g. retry limit, AIFS, CW size, MCS order and/or CCA threshold) may be adapted to channel congestion levels, channel errors and/or traffic priority levels. Parameter adaptation may be coordinated across layers (e.g. between MAC and PHY layer parameters). Congestion levels may be detected, for example, using a smoothed queue size and/or channel busy time. Traffic may be transmitted using adapted parameters, such as reduced retry limits for a high congestion level and increased retry limits for priority traffic in response to channel error. Feedback may support parameter (Continued)

adaptation. For example, feedback may be provided by a receiver and/or within a sender, such as a sender MAC and/or PHY layer or a parameter adapter providing feedback (e.g. spoofed NACK packet) to a sender application, transport and/or network layer.

12 Claims, 17 Drawing Sheets

Related U.S. Application Data

(60) Provisional application No. 62/060,405, filed on Oct. 6, 2014.

(51) Int. Cl.
*H04L 1/00* (2006.01)
*H04W 28/04* (2009.01)
*H04L 29/06* (2006.01)
*H04L 12/801* (2013.01)

(52) U.S. Cl.
CPC ......... *H04L 47/24* (2013.01); *H04W 28/0268* (2013.01); *H04L 47/11* (2013.01); *H04L 65/80* (2013.01); *H04W 28/04* (2013.01)

(58) Field of Classification Search
USPC .......................................................... 370/329
See application file for complete search history.

(56) References Cited

U.S. PATENT DOCUMENTS

| | | |
|---|---|---|
| 2005/0041587 A1 | 2/2005 | Lee |
| 2007/0081471 A1 | 4/2007 | Talley et al. |
| 2009/0147679 A1 | 6/2009 | Gusat et al. |
| 2010/0165856 A1 | 7/2010 | Melpignano et al. |
| 2011/0047286 A1 | 2/2011 | Harrang et al. |
| 2011/0305209 A1 | 12/2011 | Merlin et al. |
| 2013/0336113 A1 | 12/2013 | Okuyama et al. |
| 2015/0043345 A1 | 2/2015 | Testicioglu et al. |
| 2015/0296528 A1 | 10/2015 | Coffey et al. |
| 2017/0187593 A1 | 6/2017 | Balasubramanian et al. |

FOREIGN PATENT DOCUMENTS

| | | |
|---|---|---|
| EP | 2582080 A2 | 4/2013 |
| JP | 2013-046229 A | 3/2013 |
| WO | WO 2012/120772 A1 | 9/2012 |
| WO | WO 2014/049576 A2 | 4/2014 |
| WO | WO 2014/160926 A1 | 10/2014 |

OTHER PUBLICATIONS

Apple, "MacOS. It's Why There's Nothing Else Like a Mac", Available at: https://www.apple.com/mac/facetime/ ,Retrieved on Dec. 7, 2017, 11 pages.
Biaz et al., "Discriminating Congestion Losses From Wireless Losses Using Inter-Arrival Times at the Receiver", Application-Specific Systems and Software Engineering and Technology, IEEE Symposium on, Richardson, TX, 1999, 8 pages.
Chen et al., "Measuring Cellular Networks: Characterizing 3G, 4G, and Path Diversity", Annual Conference of International Technology Alliance, 2012, 8 pages.
Holmer et al., "Handling Packet Loss in WebRTC", IEEE International Conference on Image Processing, Melbourne, VIC, 2013, pp. 1860-1864.
Jardosh et al., "Understanding Congestion in IEEE 802.11b Wireless Networks", IMC '05 Proceedings of the 5th ACM SIGCOMM conference on Internet Measurement, Berkeley, CA, Oct. 19-21, 2005, 14 pages.
Lundin et al., "A Google Congestion Control Algorithm for Real-Time Communication on the World Wide Web", Draft-Alvestrand-Rtcweb-Congestion-03, Network Working Group, Apr. 25, 2013, pp. 1-18.
OPNET, "OPNET Is Now Part of Riverbed Steelcentral", Available at: https://www.opnet.com/solutions/network_rd/system_in_the_loop.html , Retrieved on Dec. 7, 2017, 5 pages.
Ott et al., "Extended RTP Profile for Real-Time Transport Control Protocol (RTCP)-Based Feedback (RTP/AVPF)", Network Working Group, RFC 4585, Jul. 2006, pp. 1-51.
Schulzrinne et al., "RTP: A Transport Protocol for Real-Time Applications", The Internet Engineering Task Force (IETF), Request for Comments: 3550, Jul. 2003, pp. 1-89.
WebRTC, Available at: http://www.webrtc.org/ , Retrieved on Dec. 7, 2017, 3 pages.

FIG. 13

| | | | | | |
|---|---|---|---|---|---|
| 2475 265.237168 | 54.235.100.147 | 192.168.2.2 | HTTP | 824 | HTTP/1.1 204 No Content |
| 2494 269.900110 | 192.168.2.2 | 54.235.100.147 | HTTP | 172 | POST /silverlightEvent HTTP/1.1 (application/x-www-form-urlencoded) |
| 2499 270.011519 | 54.235.100.147 | 192.168.2.2 | HTTP | 824 | HTTP/1.1 204 No Content |
| 2597 271.122145 | 192.168.2.2 | 108.175.46.96 | HTTP | 371 | GET /clientaccesspolicy.xml HTTP/1.1 |
| 2600 271.281403 | 108.175.46.96 | 192.168.2.2 | HTTP/XML | 870 | HTTP/1.1 200 OK |
| 2603 271.320226 | 192.168.2.2 | 108.175.46.96 | HTTP | 554 | GET /range/0-175317o=AQEikD9WH09LbCBH-BxgajXBl9g21jhERi42S1vTr7AL7dItqUPaUWoCzksjdswrbdfbgBhbKIhkziHbs |
| 2610 271.468044 | 192.168.2.2 | 108.175.46.96 | HTTP | 553 | GET /range/0-175317o=AQEikD9WH09LbCBC9hiiaT3CsNopkSJaXX8qFRPV-vhY4tttqULNEZNcz1b1IEzdiarfvxRXGgQphU2M |
| 2617 271.479217 | 192.168.2.2 | 108.175.46.96 | HTTP | 553 | GET /range/0-175317o=AQEikD9WH09LbCBC9hiiaDTDsd0pkSJaXX8qFRPV-vhy4tttqULNEZNcz1b1IEzdiarfvxRXGgQphU2M |
| 2619 271.480236 | 192.168.2.2 | 108.175.46.96 | HTTP | 553 | GET /range/0-175317o=AQEikD9WH09LbCBC9hiiaDXFs9opkSJaXX8qFRPV-vhY4tttqULNEZNcz1b1IEzdiarfvxRXGgQphU2M |
| 2620 271.480970 | 192.168.2.2 | 108.175.46.96 | HTTP | 553 | GET /range/0-175317o=AQEikD9WH09LbCBC9hiibibBtt4pkSJaXX8qFRPV-vhY4tttqULNEZNcz1b1IEzdiarfvxRXGgQphU2M |

1400

Hypertext Transfer Protocol
GET /clientaccesspolicy.xml HTTP/1.1\r\n
[Expert Info (Chat/Sequence): GET /clientaccesspolicy.xml HTTP/1.1\r\n]
 [Severity level: chat]
 [Group: Sequence]
Request Method: GET
Request version: /clientaccesspolicy.xml

FIG. 14

| | | | | | |
|---|---|---|---|---|---|
| 2475 | 265.237168 | 54.235.100.147 | 192.168.2.2 | HTTP | 824 HTTP/1.1 204 No Content |
| 2494 | 269.900110 | 192.168.2.2 | 54.235.100.147 | HTTP | 172 POST/SilverlightEvent HTTP/1.1 (application/x-www-form-urlencoded) |
| 2499 | 270.011519 | 54.235.100.147 | 192.168.2.2 | HTTP | 824 HTTP/1.1 204 No Content |
| 2597 | 271.122145 | 192.168.2.2 | 108.175.46.96 | HTTP | 371 GET /clientaccesspolicy.xml HTTP/1.1 |
| 2600 | 271.281403 | 108.175.46.96 | 192.168.2.2 | HTTP/XML | 870 HTTP/1.1 200 OK |
| 2603 | 271.320226 | 192.168.2.2 | 108.175.46.96 | HTTP | 554 GET /range/0-1753!?o=AQEIkD9WH09LbCBH-BxgajXBl9g21jhERi42S1vTr7AL7dltqJPaUWoCzkSjdsw4bdfbgBhbKhkziHbS |
| 2610 | 271.468044 | 192.168.2.2 | 108.175.46.96 | HTTP | 553 GET /range/0-1753!?o=AQEIkD9WH09LbCBC9hiaT3CsNopkSJaXXBqFRPVvhY4tttqULNEzNcz1b1lEzdarfvxRXGgQphU2M |
| 2617 | 271.479217 | 192.168.2.2 | 108.175.46.96 | HTTP | 553 GET /range/0-1753!?o=AQEIkD9WH09LbCBC9hiaDTDsd0pkSJaXXBqFRPV-vhY4tttqULNEzNcz1b1lEzdarfvxRXGgQphU2M |
| 2619 | 271.480236 | 192.168.2.2 | 108.175.46.96 | HTTP | 553 GET /range/0-1753!?o=AQEIkD9WH09LbCBC9hiaDXFs9opkSJaXXBqFRPV-vhY4tttqULNEzNcz1b1lEzdarfvxRXGgQphU2M |
| 2620 | 271.480970 | 192.168.2.2 | 108.175.46.96 | HTTP | 553 GET /range/0-1753!?o=AQEIkD9WH09LbCBC9hiblbBt4pkSJaXXBqFRPV-vhY4tttqULNEzNcz1b1lEzdarfvxRXGgQphU2M |

```
<?
<access-policy>
  <cross-domain-access>
    <policy>
      <allow-from
      http-request-headers="Range">
        <domain
        </domain
        <domain
        uri="http://*.netflix.ca"/>
```

FIG. 15

| | | | | | |
|---|---|---|---|---|---|
| 2499 270.011519 | 54.235.100.147 | 192.168.2.2 | HTTP | 824 | HTTP/1.1 204 No Content |
| 2597 271.122145 | 192.168.2.2 | 108.175.46.96 | HTTP | 371 | GET /clientaccesspolicy.xml HTTP/1.1 |
| 2600 271.281403 | 108.175.46.96 | 192.168.2.2 | HTTP/XML | 870 | HTTP/1.1 200 OK |
| 2603 271.320226 | 192.168.2.2 | 108.175.46.96 | HTTP | 554 | GET /range/0-175317o=AQEIkD9WH09LbCBH-BxgajXBt9g21jhERi42S1vTr7AL7dItqUPaUWoCzkSjdsw4bdfbgBhbKhkziHbS |
| 2610 271.468044 | 192.168.2.2 | 108.175.46.96 | HTTP | 553 | GET /range/0-175317o=AQEIkD9WH09LbCBH-BxgajXBt9g21jhERi42S1vTr7AL7dItqUPaUWoCzkSjaXXBqFRPV-vhY4tttqULNEzNcz1b1lEzdarfvxRXGgQphU2M |
| 2617 271.479217 | 192.168.2.2 | 108.175.46.96 | HTTP | 553 | GET /range/0-175317o=AQEIkD9WH09LbCBH-BxgajXBt9g21jhERi42S1vTr7AL7dItqUPaUWoCzkSjaXXBqFRPV-vhY4tttqULNEzNcz1b1lEzdarfvxRXGgQphU2M |
| 2619 271.480236 | 192.168.2.2 | 108.175.46.96 | HTTP | 553 | GET /range/0-175317o=AQEIkD9WH09LbCBH-BxgajXBt9g21jhERi42S1vTr7AL7dItqUPaUWoCzkSjaXXBqFRPV-vhY4tttqULNEzNcz1b1lEzdarfvxRXGgQphU2M |
| 2620 271.480970 | 192.168.2.2 | 108.175.46.96 | HTTP | 553 | GET /range/0-175317o=AQEIkD9WH09LbCBH-BxgajXBt9g21jhibibBtt4pkSJaXXBqFRPV-vhY4tttqULNEzNcz1b1lEzdarfvxRXGgQphU2M |

GET /range/0-175317o=AQEIkD9WH09LbCBH-BxgajXBt9g21jhERi42S1vTr7AL7dItqUPaUWoCzkSjdsw4bdfbgBhbKhkziHbSrHKWq3ug6-QtTfiw3Ye5uXZNIgzypMb0d7x-vvXPhvJH&e=38e=1410441fa2
[truncated Expert Info: (chat/Sequence): GET /range/0-175317o=AQEIkD9WH09LbCBH-BxgajXBt9g21jhERi42S1vTr7AL7dItqUPaUWoCzkSjdsw4bdfbgBhbKhkziHbSrHKWq3ug6-QtTfiw3Ye
[Message: GET /range/0-175317o=AQEIkD9WH09LbCBH-BxgajXBt9g21jhERi42S1vTr7AL7dItqUPaUWoCzkSjdsw4bdfbgBhbKhkziHbSrHKWq3ug6-QtTfiw3Ye5uXZNIgzypMb0d7x-vvXPhvJH&v
[Severity level: Chat]
[Group: Sequence]
Request Method: GET
Request version: HTTP/1.1
Host: 108.175.46.96\r\n
User-Agent: Mozilla/5.0 (windows NT 6.1; wow64; rv:32.0) Gecko/20100101 Firefox/32.0\r\n

ADAPTING COMMUNICATION PARAMETERS TO LINK CONDITIONS, TRAFFIC TYPES, AND/OR PRIORITIES

CROSS REFERENCE TO RELATED APPLICATIONS

This application is a continuation of U.S. patent application Ser. No. 15/515,865 filed Mar. 30, 2017, which is a National Stage Entry under 35 U.S.C. § 371 Patent Cooperation Treaty Application No. PCT/US2015/054190 filed Oct. 6, 2015, which claims the benefit of U.S. Provisional Patent Application No. 62/060,405 filed Oct. 6, 2014, the entire contents of each of which are incorporated herein by reference.

BACKGROUND

Mobile devices such as smart phones and tablet computers have contributed to rapid growth in mobile multimedia communications. Video traffic accounts for a large percentage of mobile data traffic. Many mobile devices have advanced multimedia capabilities and resource intensive applications such as video streaming, video conferencing and video chatting that use high resolution video. Wireless local area networking (WLAN), which may be referred to as Wi-Fi or WiFi and may be based on IEEE 802.11 standards, may be utilized to deliver video data and other types of traffic to mobile and fixed devices.

Real-time traffic, such as traffic associated with real-time video applications (e.g. video chatting and conferencing) may impose challenging latency requirements on wireless networks to maintain QoS. For example, in mobile video telephony operating over WLAN links, transmission errors in WLAN networks may degrade video quality. Transmission errors may be the result of congestion at one or more points in a network.

SUMMARY

Systems, methods, and instrumentalities are provided for adapting communication parameter(s) based on one or more of link condition(s), traffic type(s), or priorit(ies). A communication parameter(s), such as WiFi transmission parameter(s) (e.g. retry limit, AIFS, CW size, MCS order and/or CCA threshold), may be adapted based on one or more of channel congestion level(s) and/or traffic priority level(s). For example, a device such as a wireless transmit/receive unit (WTRU) may determine a congestion level associated with a communication channel and a priority level associated with traffic to be transmitted on the communication channel. The congestion level and the priority level may each (e.g., independently) weigh in favor of adjusting a transmission parameter up or down. A transmission parameter may control how much access the WTRU has to the communication channel (e.g., a retry limit, an AIFS, a CW size, etc.), how the WTRU may access the communication channel (e.g., an MCS), etc. The WTRU may adapt one or more transmission parameter(s) taking into account the congestion level and/or priority level.

The congestion level may relate, at least in part, to different types of channel conditions (e.g., channel congestion, channel error, etc.). The priority level may relate, at least in part, to different types of traffic to be transmitted, for example, progressive download traffic may have a higher priority (e.g., a higher priority for transmission) than adaptive streaming traffic.

Parameter adaptation may be coordinated across layers (e.g. between MAC and PHY layer parameters). Congestion level(s) may be detected, for example, using a smoothed queue size and/or channel busy time. Feedback may support parameter adaptation. For example, feedback may be provided by a receiver and/or within a sender, such as a sender MAC and/or PHY layer or a parameter adapter providing feedback (e.g. spoofed NACK packet) to a sender application, transport and/or network layer.

BRIEF DESCRIPTION OF THE DRAWINGS

A more detailed understanding may be had from the following description, given by way of example in conjunction with the accompanying drawings.

FIG. 13 illustrates an example of network protocol analyzer output.

FIG. 14 illustrates an example of network protocol analyzer output.

FIG. 15 illustrates an example of network protocol analyzer output.

FIG. 16 illustrates an example of network protocol analyzer output.

FIG. 17 illustrates plots comparing example results of freeze duration with EPLF turned off and turned on.

FIG. 18 illustrates plots comparing example results of freeze duration with EPLF turned off and turned on.

DETAILED DESCRIPTION

A detailed description of illustrative examples will now be described with reference to the various figures. Although this description provides a detailed example of possible implementations, it should be noted that the details are intended as illustrative examples only and in no way limit the scope of the application.

Figure 1A:
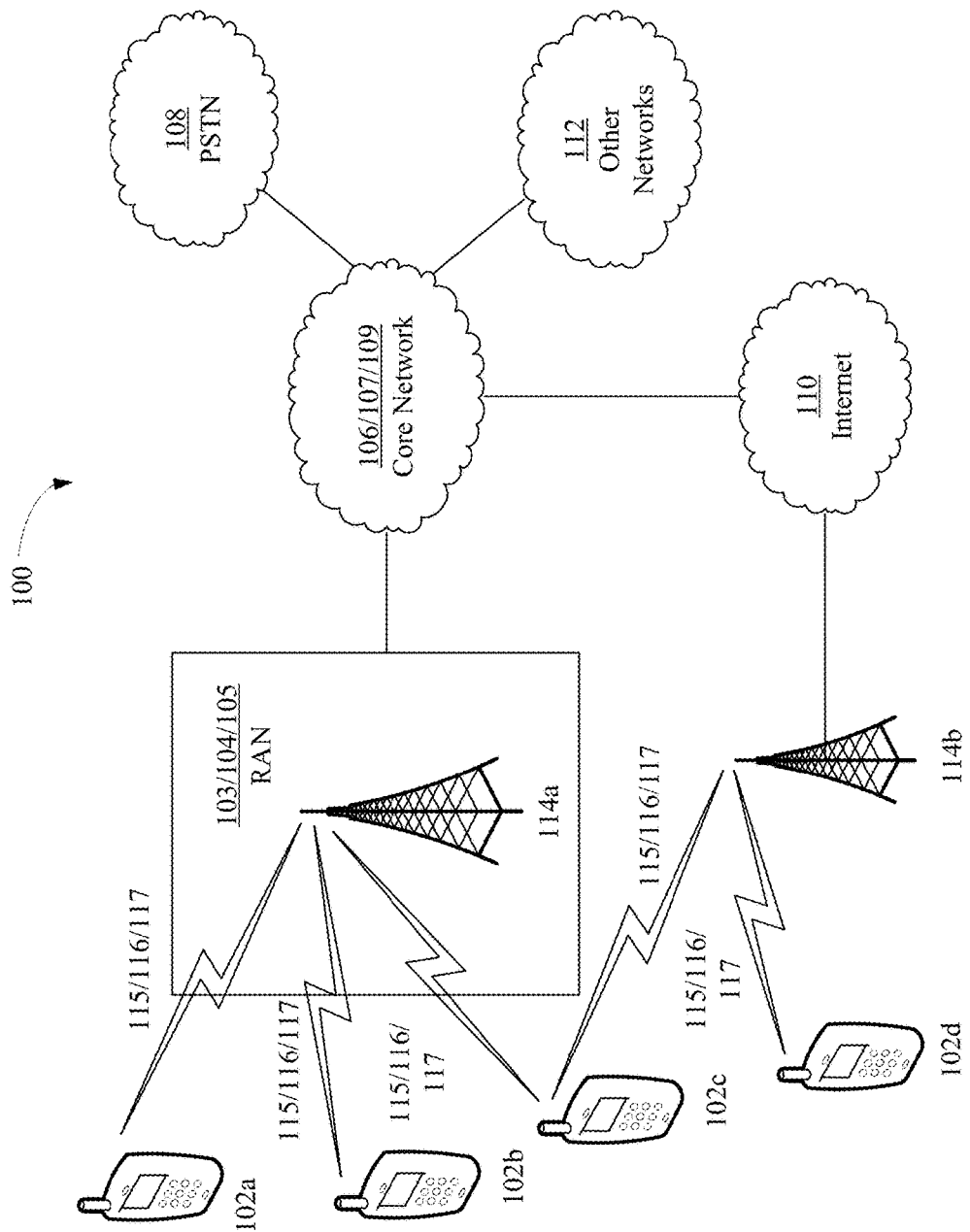
FIG. 1A is a diagram of an example communication system in which the disclosed subject matter may be implemented.

FIG. 1A is a diagram of an example communication system in which the disclosed subject matter may be implemented. One or more disclosed features may be implemented in communication system 100. For example, a wireless network (e.g. a wireless network comprising one or more components of communication system 100) may be configured such that bearers that extend beyond the wireless network (e.g. beyond a walled garden associated with the wireless network) may be assigned QoS characteristics.

Communication system 100 may be a multiple access system that provides content, such as voice, data, video, messaging, broadcast, etc., to multiple wireless users. Communication system 100 may enable multiple wireless users to access such content through the sharing of system resources, including wireless bandwidth. For example, communication system 100 may employ one or more channel access technologies, such as code division multiple access (CDMA), time division multiple access (TDMA), frequency division multiple access (FDMA), orthogonal FDMA (OFDMA), single-carrier FDMA (SC-FDMA), etc.

Communication system 100 may comprise, for example, at least one wireless transmit/receive unit (WTRU), e.g., WTRUs 102a, 102b, 102c, and 102d, radio access network (RAN) 104, core network 106, public switched telephone network (PSTN) 108, Internet 110 and other networks 112. The disclosed subject matter contemplates any number of WTRUs, base stations, networks and/or network elements. A WTRU, e.g., WTRUs 102a, 102b, 102c, 102d, may be any type of device configured to operate and/or communicate in a wireless environment, e.g., by transmitting and/or receiving wireless signals. In an example, WTRUs 102a, 102b, 102c, 102d may comprise user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, etc.

Communication system 100 may comprise one or more base stations, e.g., base station 114a and base station 114b. Base stations 114a, 114b may be any type of device configured to wirelessly interface with at least one WTRU, e.g., WTRUs 102a, 102b, 102c, 102d, to facilitate access to one or more communication networks, such as the core network 106, Internet 110, and/or networks 112. A base station, e.g., base stations 114a, 114b, may be, for example, a base transceiver station (BTS), a Node-B, an eNode B, a Home Node B, a Home eNode B, a site controller, an access point (AP), a wireless router, etc. While base stations 114a, 114b are each depicted as a single element, base stations 114a, 114b may comprise any number of interconnected base stations and/or network elements.

Base station 114a may be part of RAN 103/104/105, which may comprise other base stations and/or network elements (not shown), such as a base station controller (BSC), a radio network controller (RNC), relay nodes, etc. Base station 114a and/or base station 114b may be configured to transmit and/or receive wireless signals within a particular geographic region, which may be referred to as a cell (not shown). A cell may further be divided into cell sectors. For example, a cell associated with the base station 114a may be divided into three sectors. Base station 114a may comprise multiple (e.g. three) transceivers, e.g., one for each sector of the cell. Base station 114a may employ multiple-input multiple output (MIMO) technology and/or may utilize multiple transceivers for each sector of the cell.

Base stations 114a, 114b may communicate with one or more WTRUs 102a, 102b, 102c, 102d over an air interface 115/116/117, which may be any suitable wireless communication link (e.g. radio frequency (RF), microwave, infrared (IR), ultraviolet (UV), visible light, etc.). Air interface 115/116/117 may be established using any suitable radio access technology (RAT).

Communications system 100 may be a multiple access system and may employ one or more channel access schemes, such as CDMA, TDMA, FDMA, OFDMA, SC-FDMA, and the like. In an example, base station 114a in RAN 103/104/105 and WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may comprise communication protocols, such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

Base station 114a and WTRUs 102a, 102b, 102c may implement a radio technology such as Evolved UMTS Terrestrial Radio Access (E-UTRA), which may establish air interface 115/116/117 using Long Term Evolution (LTE) and/or LTE-Advanced (LTE-A).

Base station 114a and WTRUs 102a, 102b, 102c may implement radio technologies such as IEEE 802.16 (e.g., Worldwide Interoperability for Microwave Access (Wi-MAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

Base station 114b may be a wireless router, Home Node B, Home eNode B, or access point, for example. Base station 114b may utilize any suitable RAT for facilitating wireless connectivity in a localized area, such as a place of business, a home, a vehicle, a campus, and the like. Base station 114b and WTRUs 102c, 102d may implement a radio technology such as IEEE 802.11 to establish a wireless local area network (WLAN). Base station 114b and WTRUs 102c, 102d may implement a radio technology such as IEEE 802.15 to establish a wireless personal area network (WPAN). Base station 114b and WTRUs 102c, 102d may utilize a cellular-based RAT (e.g. WCDMA, CDMA2000, GSM, LTE, LTE-A, etc.) to establish a picocell or femtocell. Base station 114b may have a direct connection to the Internet 110. Base station 114b may or may not access the Internet 110 via the core network 106/107/109.

RAN 103/104/105 may be in communication with core network 106/107/109, which may be any type of network configured to provide voice, data, applications, and/or voice over internet protocol (VoIP) services to one or more WTRUs 102a, 102b, 102c, 102d. In an example, core network 106/107/109 may provide call control, billing services, mobile location-based services, pre-paid calling, Internet connectivity, video distribution, etc. Core network 106/107/109 may perform high-level security functions, such as user authentication. Although not shown in FIG. 1A, RAN 103/104/105 and/or core network 106/107/109 may be in direct or indirect communication with other RANs that employ the same RAT as the RAN 103/104/105 or a different RAT. For example, in addition to being connected to RAN 103/104/105, which may be utilizing an E-UTRA radio technology, core network 106/107/109 may be in communication with another RAN (not shown) employing a GSM radio technology.

Core network 106/107/109 may serve as a gateway for WTRUs 102a, 102b, 102c, 102d to access PSTN 108, Internet 110 and/or other networks 112. PSTN 108 may comprise circuit-switched telephone networks that provide plain old telephone service (POTS). Internet 110 may comprise a global system of interconnected computer networks and devices that use common communication protocols, such as transmission control protocol (TCP), user datagram protocol (UDP) and internet protocol (IP) in a TCP/IP internet protocol suite. Networks 112 may comprise wired and/or wireless communications networks owned and/or operated by other service providers. For example, networks 112 may comprise another core network connected to one or more RANs, which may employ the same RAT as the RAN 103/104/105 or a different RAT.

Some or all WTRUs 102a, 102b, 102c, 102d in communications system 100 may have multi-mode capabilities. In an example, WTRUs 102a, 102b, 102c, 102d may have multiple transceivers for communicating with different wireless networks over different wireless links. For example, WTRU 102c may be configured to communicate with base station 114a, which may employ a cellular-based radio technology, and with the base station 114b, which may employ an IEEE 802 radio technology.

Figure 1B:
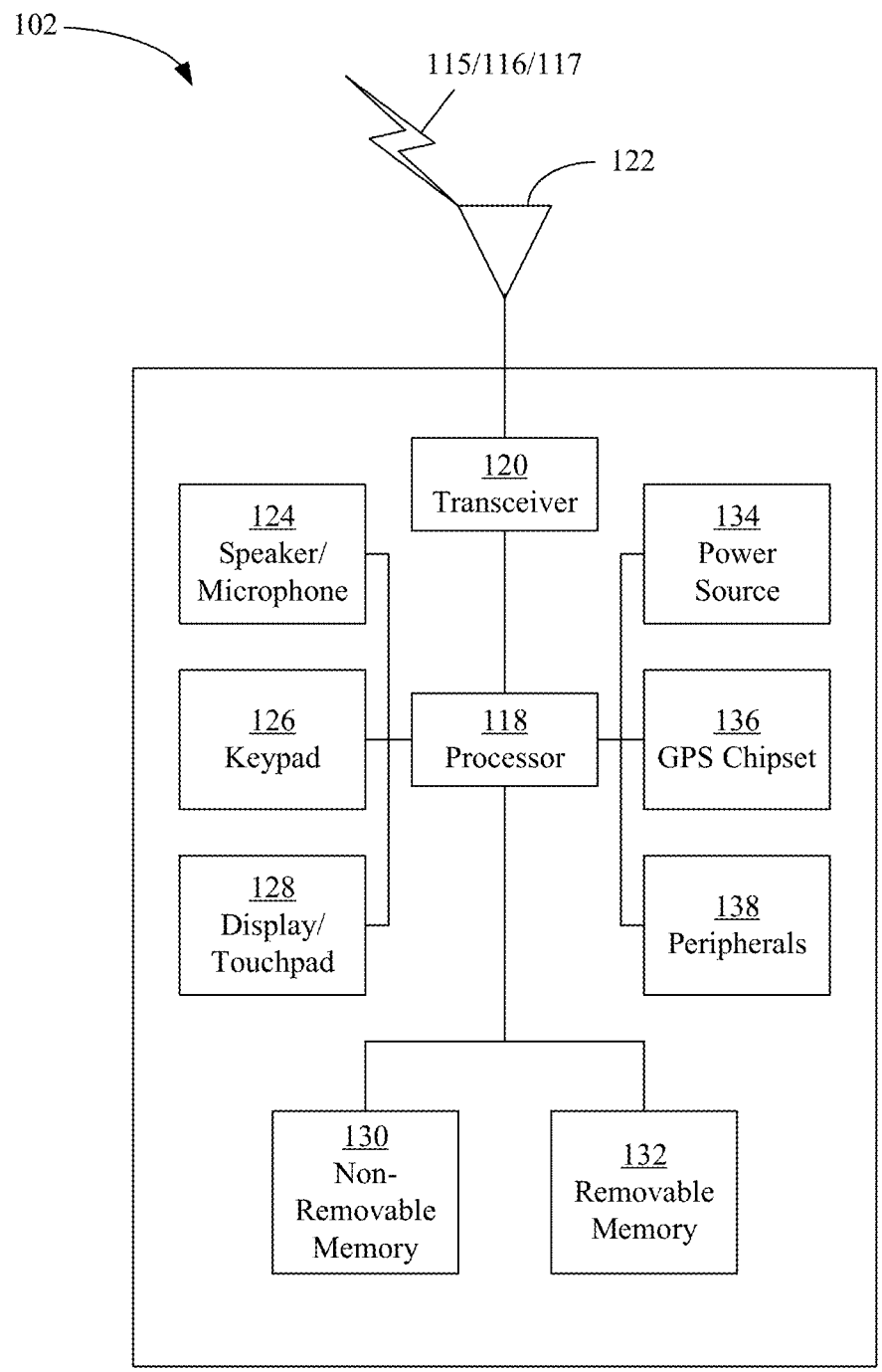
FIG. 1B is a diagram of an example WTRU that may be used in a communications system.

FIG. 1B is a diagram of an example WTRU that may be used in a communications system. FIG. 1B may show an example of WTRU 102. WTRU 102 may have one or more of a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. Base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may have one or more of the elements depicted in FIG. 1B and described herein.

Processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 118 may perform signal coding, data processing, power control, input/output processing, and/or any other functionality that enables WTRU 102 to operate in a wireless environment. Processor 118 may be coupled to the transceiver 120, which may be coupled to transmit/receive element 122. Although FIG. 1B depicts processor 118 and transceiver 120 as separate components, they may be integrated together, in whole or in part, in an electronic package or chip.

Transmit/receive element 122 may be configured to transmit signals to, or receive signals from, a base station (e.g. base station 114a) over the air interface 115/116/117. In an example, transmit/receive element 122 may be an antenna configured to transmit and/or receive RF signals. Transmit/receive element 122 may be an emitter/detector configured to transmit and/or receive IR, UV, or visible light signals. Transmit/receive element 122 may be configured to transmit and receive both RF and light signals. Transmit/receive element 122 may be configured to transmit and/or receive any combination of wireless signals.

Although transmit/receive element 122 is depicted in FIG. 1B as a single element, WTRU 102 may have any number of transmit/receive elements 122. WTRU 102 may employ MIMO technology. WTRU 102 may have two or more transmit/receive elements 122 (e.g. multiple antennas) for transmitting and receiving wireless signals over air interface 115/116/117.

Transceiver 120 may be configured to modulate signals that are to be transmitted by transmit/receive element 122 and to demodulate signals that are received by transmit/receive element 122. WTRU 102 may have multi-mode capabilities. Transceiver 120 may have multiple transceivers for enabling the WTRU 102 to communicate via multiple RATs, such as UTRA and IEEE 802.11.

Processor 118 of WTRU 102 may be coupled to, and may receive user input data from one or more input components, such as speaker/microphone 124, keypad 126 and/or display/touchpad 128 (e.g. a liquid crystal display (LCD) display unit or organic light-emitting diode (OLED) display unit). Processor 118 may output user data to one or more output components, such as speaker/microphone 124, keypad 126 and/or the display/touchpad 128. Processor 118 may access information from, and store data in, any type of suitable memory, such as non-removable memory 130 and/or removable memory 132. Non-removable memory 130 may have random-access memory (RAM), read-only memory (ROM), a hard disk and/or any other type of memory storage device. Removable memory 132 may have a subscriber identity module (SIM) card, a memory stick, a secure digital (SD) memory card and the like. Processor 118 may access information from, and store data in, memory that is not physically located on the WTRU 102, such as on a server or a home computer (not shown).

Processor 118 may receive power from power source 134. Processor 118 may be configured to distribute and/or control power to other components in the WTRU 102. Power source 134 may be any suitable device for powering the WTRU 102. For example, power source 134 may include one or more dry cell batteries (e.g. nickel-cadmium (NiCd), nickel-zinc (NiZn), nickel metal hydride (NiMH), lithium-ion (Li-ion)), solar cells, fuel cells and the like.

Processor 118 may be coupled to GPS chipset 136, which may be configured to provide location information (e.g. longitude and latitude) regarding the current location of WTRU 102. In addition to, or in lieu of, information from GPS chipset 136, WTRU 102 may receive location information over air interface 115/116/117 from a base station (e.g. base stations 114a, 114b) and/or determine its location based on the timing of signals being received from two or more nearby base stations. WTRU 102 may acquire location information by way of any suitable location-determination implementation.

Processor 118 may be coupled to other peripherals 138, which may comprise one or more software and/or hardware modules that provide additional features, functionality and/or wired or wireless connectivity. For example, peripherals 138 may comprise an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser and the like.

Figure 1C:
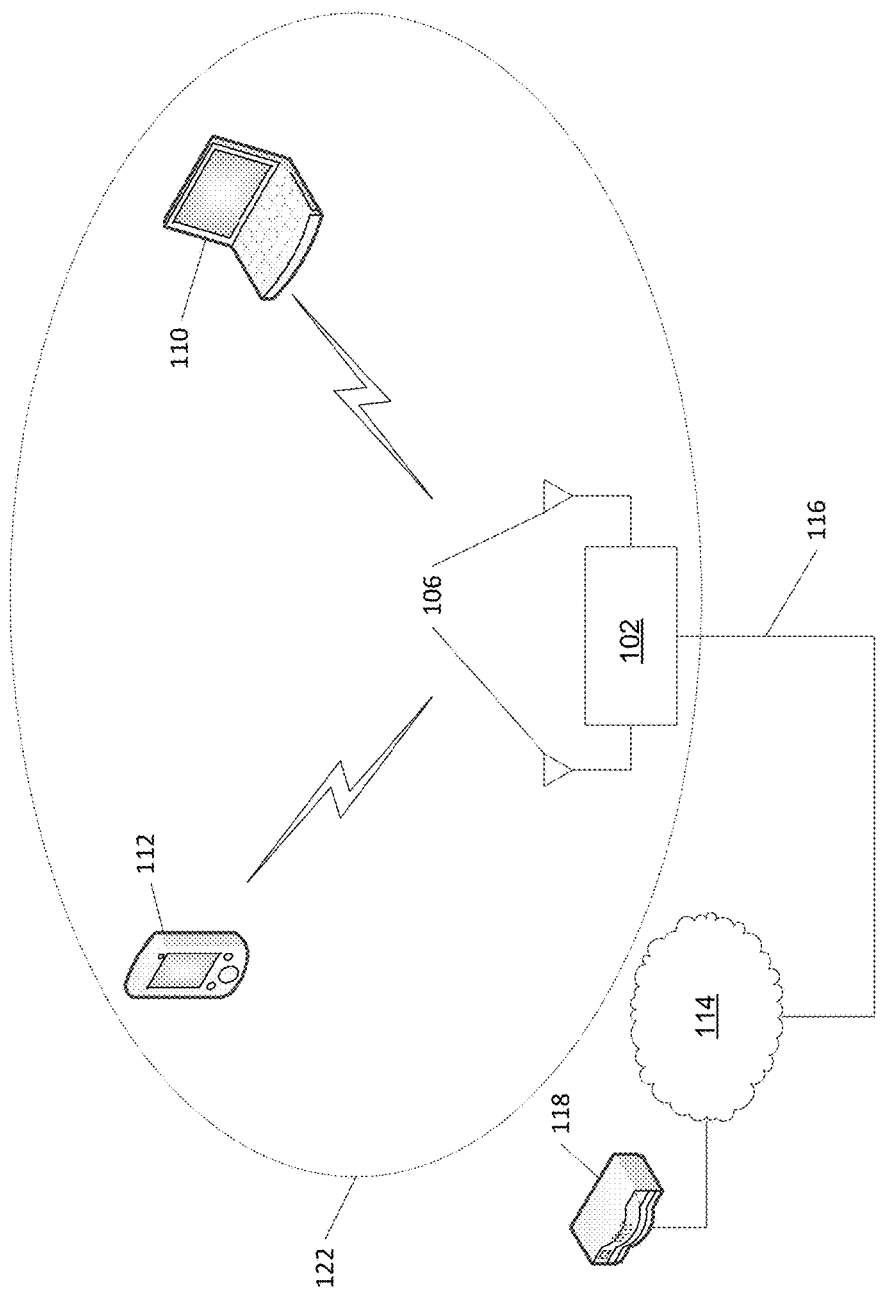
FIG. 1C is a diagram of an example Wi-Fi communication system in which the disclosed subject matter may be implemented.

FIG. 1C is a diagram of an example Wi-Fi communication system in which the disclosed subject matter may be implemented. FIG. 1C shows examples of wireless local area network (WLAN) devices. One or more of the devices may be used to implement one or more of the features described herein. A WLAN may comprise, for example, access point (AP) 102, station (STA) 110 and STA 112. STA 110 and 112 may be associated with AP 102. A WLAN may be configured to implement one or more protocols of the IEEE 802.11 communication standard, which may comprise a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g. STA 110) may have traffic intended for a destination STA (e.g. STA 112). STA 110 may send the traffic to AP 102, which may send the traffic to STA 112.

A WLAN may operate in an ad-hoc mode. An ad-hoc mode WLAN may be referred to as an independent basic service set (IBBS). In an ad-hoc mode WLAN, STAs may communicate directly with each other (e.g. STA 110 may communicate with STA 112 without such communication being routed through an AP).

IEEE 802.11 devices (e.g. IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g. a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter, which may be combined in a transceiver, one or more antennas (e.g. antennas 106), etc. A processor function may comprise one or more processors. For example, the processor may comprise one or more of a general purpose processor, a special purpose processor (e.g. a baseband processor, a MAC processor, etc.), a digital signal processor (DSP), Application Specific Integrated Circuits (ASICs), Field Programmable Gate Array (FPGA) circuits, any other type of integrated circuit (IC), a state machine, etc. The one or more processors may be integrated or not integrated with each other. The processor (e.g. the one or more processors or a subset thereof) may be integrated with one or more other functions (e.g. other functions such as memory). A processor may perform signal coding, data processing, power control, input/output processing, modulation, demodulation and/or any other functionality that may enable the device to operate in a wireless environment, such as a WLAN. A processor may be configured to execute processor executable code (e.g. instructions) including, for example, software, and/or firmware instructions. For example, the processer may be configured to execute computer readable instructions included on one or more of the processor (e.g. a chipset that includes memory and a processor) or memory. Execution of the instructions may cause the device to perform one or more of the functions described herein.

A device may include one or more antennas. A device may employ multiple input multiple output (MIMO) techniques. One or more antennas may receive one or more radio signals using one or more radio technologies. A processor may receive one or more radio signals, e.g., via the one or more antennas. The one or more antennas may transmit one or more radio signals (e.g. based on one or more signals sent from the processor).

A device may have a memory that may include one or more devices for storing programming and/or data, such as processor executable code or instructions (e.g. software, firmware, etc.), electronic data, databases, or other digital information. Memory may comprise one or more memory units. One or more memory units may be integrated with one or more other functions (e.g. other functions in the device, such as a processor). Memory may comprise one or more of a read-only memory (ROM) (e.g. erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. Memory may be coupled to a processer. A processer may communicate with one or more entities of memory, e.g., via a system bus, directly, etc.

Communication parameter adaptation may be applied in a variety of communication scenarios, such as video telephony. Video telephony may have stringent delay constraints. These constraints may be monitored and/or managed, for example, by using real-time transport protocol (RTP) and/or user datagram protocol (UDP) as delivery protocols for video telephony. RTP and UDP may not guarantee the delivery of every packet across a lossy communication network that is prone to packet loss. Packet loss may lead to artifacts and/or freezing of decoded video rendered on a display. A lossy communication network may comprise, for example, the Internet.

Figure 2:
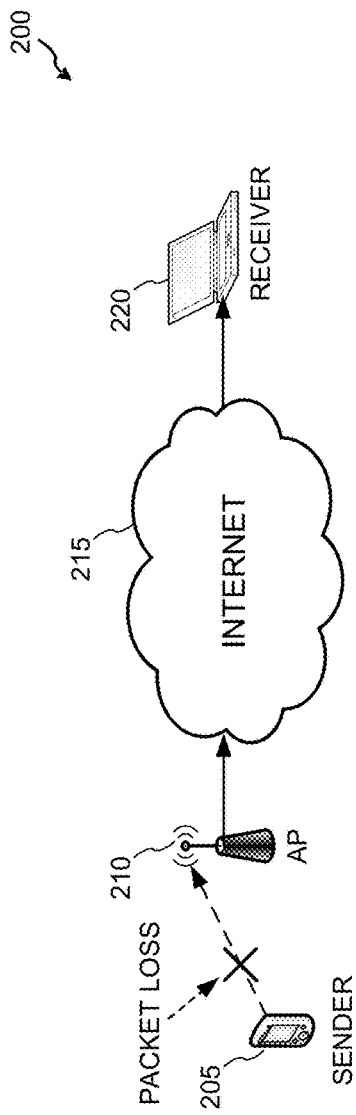
FIG. 2 illustrates an example communication scenario in which the disclosed subject matter may be implemented.

FIG. 2 illustrates an example communication scenario in which disclosed subject matter may be implemented. Communication system 200 comprises video sender 205, access point (AP) 210, Internet 215 and video receiver 220. Communication sender 205 may comprise, for example, a WTRU, such as a cellular phone or any of a variety of other devices that may communicate with AP 210. AP 210 may comprise, for example, a base station, such as a BTS, AP or any of a variety of other devices that may communicate with communication sender 205. Internet 215 may comprise any one or more networks that may permit video sender 205 to communicate with video receiver 220. AP 210 and Internet 215 may represent, for example, at least part of communication system 100 in FIG. 1A, such as one or more of RAN 103/104/105, core network 106/107/109, other networks 112, PSTN 108 and/or Internet 110. Receiver 220 may comprise, for example, a WTRU or wired communication device, such as a notebook computer or any of a variety of other devices that may communicate with video sender 205, e.g., over one or more networks.

A communication may comprise one or more packet flows between sender 205 and receiver 220. A communication may comprise any type of traffic sent and received by any type of application. A communications comprising video (e.g. real-time video, such as video conferencing) may be transmitted by sender 205 to receiver 220, for example, over a network with a wireless link (e.g. IEEE 802.11n wireless link). In an example, sender (e.g. WiFi STA) 205 may connect to a communication network via a WiFi access point (AP), e.g., AP 210. An Internet link may comprise a core of a network while a Wi-Fi (e.g. IEEE 802.11) link may comprise an edge of a network.

Sender (e.g. Wi-Fi STA) 205 may collect information that may be used to adapt one or more communication parameters for one or more flows between sender 205 and receiver 220. Sender 205 may, for example, identify in a traffic flow an Internet layer packet (e.g. IP packet) that may be carrying a transport layer packet (e.g. a UDP packet) that in turn may be carrying an application layer packet (e.g. an RTCP packet). Sender 205 may store the source IP address and the destination IP address indicated in the Internet layer packet header, the source port number and the destination port number indicated in the transport layer packet header and a sender or packet flow source identifier (e.g. Synchronization Source (SSRC) indicated in an RTCP packet header, e.g., in a WebRTC example). This 5-tuple may be recorded for each application layer packet flow. Video traffic may be sent using an Access Category (AC) of Video. Sender 205 may collect information (e.g. by inspecting packets going in the opposite direction (e.g. toward the sender)) that may be used, for example, to generate feedback, such as a spoofed NACK.

Communications over a Wi-Fi link may be prone to packet loss, for example, due to channel error and/or congestion. Channel error may be caused, for example, by poor channel conditions (e.g. deep fades), MCS probing for MCS adaptation, and/or hidden terminals. Congestion may occur, for example, when the aggregate demand for a channel persistently exceeds the capacity of that channel on a WLAN. Packet losses may occur in any environment in which a WLAN may be installed, such as at an airport, on a campus and an office building. Packet loss rates may be one-third or more of transmitted traffic in such environments. For example, a two (2) megabit-per-second (Mbps) video call with a maximum transmission unit (MTU) of 1500 bytes may experience an average packet loss occurrence approximately every 1.76 seconds, which may result in a reduced quality experience for a user (e.g. video artifacts and/or freezing).

Figure 3:
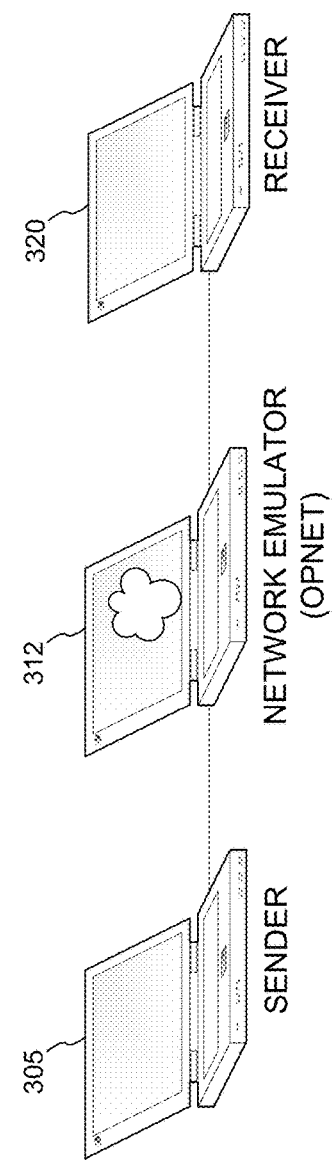
FIG. 3 illustrates an example simulation scenario.

FIG. 3 illustrates an example simulation scenario. Exemplary system 300 may illustrate a testing scenario using a video application, such as web real-time communication (WebRTC), although any application may send and/or receive any type of traffic. WebRTC may be implemented at sender 305 and receiver 320. Network emulation computer 312 between sender 305 and receiver 320 may run, for example, Optimized Network Engineering Tools (OPNET) with a system-in-the-loop (SITL) capability. SITL may allow real packets (such as RTP packets and RTCP packets) from sender 305 to enter network emulation computer 312, which may emulate the delivery of these packets through various communication networks with high fidelity, and allow successfully delivered packets to leave network emulation computer 312 for receiver 320 where video may be displayed, all taking place in real-time.

Sender 305 and receiver 320 may have a virtual nodes in a network emulated in OPNET in network emulation computer 312. EPLF may be implemented in the virtual node of sender 305, which may be activated by toggling a key on sender 305. Network emulation computer 312 may simulate one or more Wi-Fi networks as well as the Internet. A utility may be used to introduce packet losses over the simulated wireless link in a controlled manner. A realistic scenario may be used where packet losses are caused naturally by channel error (e.g. using a hidden terminal) and congestion.

A default error concealment technique used by WebRTC may be a type of frame copy that may be used where a video freezes at a previous frame when a current frame cannot be perfectly reconstructed before a scheduled display deadline. A duration of a video freeze may be given by the extra amount of time that a previous frame is displayed.

In Wi-Fi and/or other implementations, communication parameters such as a retry limit, arbitration inter-frame spacing (AIFS), modulation and coding scheme (MCS) order, clear channel assessment (CCA) threshold, contention window (CW), etc., may be fixed, in some examples fixed regardless of the state of the Wi-Fi channel. For example, a short retry limit may be set to a default value of seven (7). A channel having this parameter set to a fixed value may not be able to ensure a low packet loss probability (e.g. after retransmissions allowed by the retry limit), which may cause problems that may be dependent on the type of content, such as excessive video freeze and/or video artifacts for video content.

There may be congestion in a Wi-Fi network. A fixed value, for example, seven (7) for a short retry limit parameter, may allow stations (STAs) and/or an access point (AP) to continue retransmitting regardless of congestion, which may exacerbate congestion of the Wi-Fi network. One or more transmission parameters, e.g., media access control (MAC) and/or physical layer (PHY) parameters (e.g. 802.11 parameters) may be adjusted to improve performance, e.g., at one or more layers, such as the transport layer and/or the application layer. In some examples, congestion control mechanisms, for example those used at the transport and/or application layer, may be adjusted to improve performance.

Upper layer protocols, such as transmission control protocol (TCP), stream control transmission protocol (SCTP), and WebRTC, may implement congestion control. When there is a transmission failure in a transmission that uses such protocols, an increase in a retry limit that results in a successful delivery of a packet across a Wi-Fi channel may hide packet loss and/or may hide congestion from upper layer protocol(s). This hiding or masking of congestion and/or packet loss may negatively affect congestion control used in upper layer protocol(s), which may result in less effective congestion control. For example, given two stations (STAs) in a congested WLAN where one STA carries real-time video traffic and the other STA carries TCP traffic, an application layer congestion control algorithm may not perceive packet loss caused by congestion and may maintain its sending rate despite an increase in a retry limit for the STA carrying real-time video. The STA carrying TCP traffic may perceive the packet loss and may reduce its sending rate in response. This may result in "unfairness," where one STA addresses the congestion while the other does not. In some examples, it may not be beneficial to increase the retry limit when there is a transmission failure due to unfairness.

Parameter adaption (e.g., adapting a parameter associated with traffic transmission) may be implemented in a WTRU or network entity. Parameter adaption may adapt one or more communication parameters, such as a retry limit and/or other parameters, based on a variety of channel (e.g., link) conditions (e.g., that reflect the state of a channel) and/or traffic priorities (e.g., relative priority of a traffic flow). While some examples are provided for purposes of introduction and discussion, various implementations may adapt various communication parameters based various link conditions and/or traffic priorities. Examples of adaptable transmission parameters include one or more of the following: retry limit, AIFS, CW size, MCS order or CCA threshold. Parameters may be in one or more layers, for example, in a device implementing an Open Systems Interconnection (OSI) model. For example, retry limit, AIFS and CW size parameters may be in a data link layer (e.g., a MAC sublayer in the data link layer), MCS and CCA threshold parameters may be in a physical layer, etc. Cross-layer parameter adaptation may be coordinated, for example, by a parameter adapter.

Figure 4:
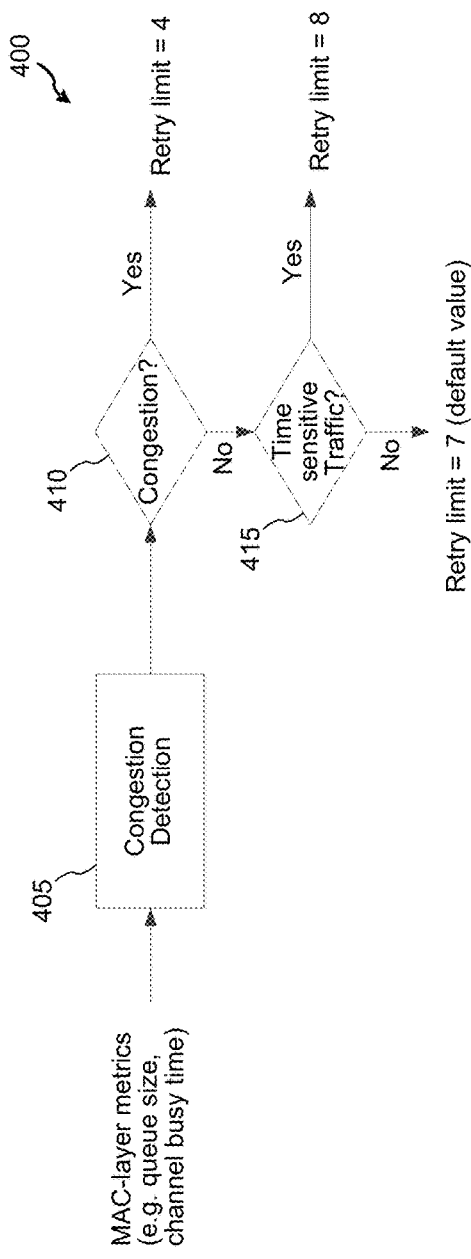
FIG. 4 illustrates an example associated with communication parameter adaptation.

FIG. 4 illustrates an example associated with communication parameter adaptation. Parameter adaptation 400 may be used, for example, to adapt parameters in communications, such as Wi-Fi channel communications. Parameter adaptation 400 is shown adapting a parameter as an example (e.g., retry limit), although other parameters may be adapted using the same or different logic.

Congestion detection 405 may determine whether congestion exists or not, e.g., based on a threshold. Congestion detection 405 may determine a level of congestion, e.g., based on a plurality of thresholds for a plurality of congestion levels. Congestion detection 405 may determine congestion, for example, based on one or more metrics. Congestion may be determined for one or more flows in one or more channels. In an example, congestion detection 405 may determine whether congestion exists and/or a congestion level based on one or more MAC layer metrics, such as a queue size and/or a channel busy time. One or more metrics may be updated, e.g., periodically and/or upon request. A congestion determination 410 may be made as to the existence, type and/or or level of congestion. A determination that congestion or a level of congestion exists may lead to maintenance or reduction of a retry limit, e.g., a reduction of a retry limit from 7 to 4, for one or more flows for one or more channels, which may help relieve congestion. A determination that congestion or a level of congestion does not exist may lead to maintenance or an increase of a retry limit.

A priority determination 415 may be made to determine the priority of traffic for one or more flows in one or more channels. A determination that traffic is time-sensitive may lead to maintenance of or an increase to a retry limit, e.g., an increase of a retry limit from 7 to 8, for one or more flows for one or more channels that may not be congested. A determination that traffic is not time-sensitive may lead to maintenance or a decrease in a retry limit, e.g., maintenance of a default retry limit at 7, for one or more flows for one or more channels that may not be congested. Each of 410 and 415, may determine, reduce, maintain or increase a communication parameter. Traffic priority may be determined and a parameter (e.g., retry limit) may be maintained or adjusted based on the determination when there is and is not congestion.

Figure 5:
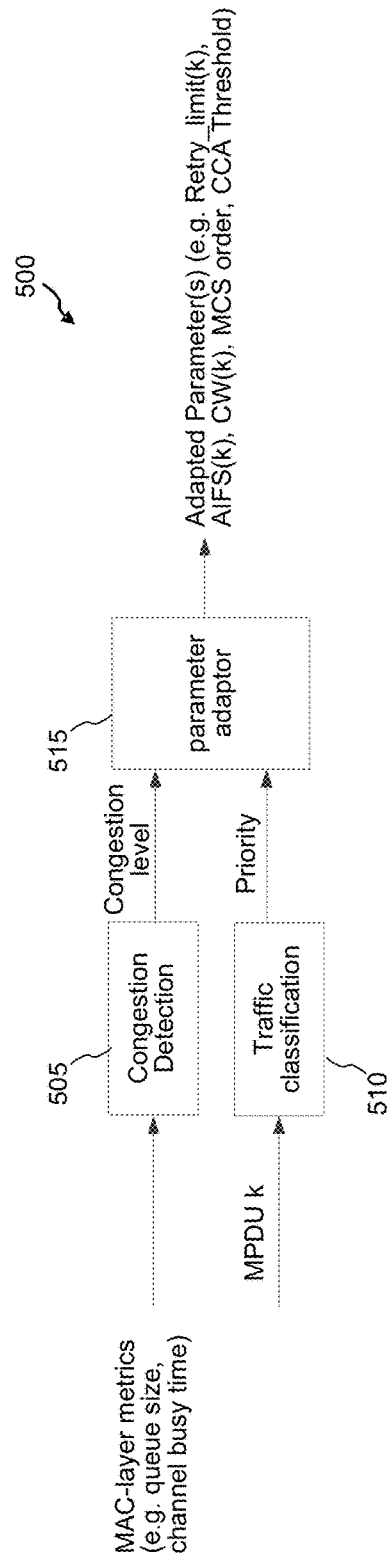
FIG. 5 illustrates an example associated with communication parameter adaptation.

FIG. 5 illustrates an example associated with communication parameter adaptation. Parameter adaptation 500 may be used, for example, to adapt parameters in communications, such as Wi-Fi channel communications. Parameter adaptation 500 is shown adapting one or more parameters (e.g. retry limit, AIFS, CW, MCS and/or CCA), although other implementations may adapt one or more and the same or different parameters using the same or different logic.

Congestion detection 505 may determine whether congestion exists or not, e.g., based on a threshold. Congestion detection 505 may determine a level of congestion, e.g., based on a plurality of thresholds for a plurality of congestion levels. Congestion detection 505 may determine congestion, for example, based on one or more metrics. Congestion may be determined for one or more flows in one or more channels. In an example, congestion detection 505 may determine whether congestion exists and/or a congestion level based on one or more MAC layer metrics, such as a queue size and/or a channel busy time. One or more metrics may be updated, e.g., periodically and/or upon request, for congestion detection. A congestion determination, e.g., a level of congestion, may be provided to parameter adapter 515.

Traffic classification 510 may identify a class or priority of traffic for one or more flows in one or more channels. Traffic classification 510 may determine a class or level of priority, e.g., based on a plurality of priority levels for traffic. Traffic classification 510 may identify a priority level, for example, based on a media access control (MAC) sublayer protocol data unit (PDU) for traffic flow k, e.g., MPDU k. A traffic priority level may be provided to parameter adapter 515.

Parameter adapter 515 receives a congestion level and a priority level for traffic. Parameter adapter 515 may adapt one or more parameters (e.g. retry limit, AIFS, CW, MCS and/or CCA). Parameter adapter 515 may apply one or more rules to adapt one or more parameters for traffic (e.g. MPDU k) based on one or more variables that may indicate one or more aspects of network conditions and/or priorities, such as variables congestion level and priority level. In parameter adaptation, variables may counteract or support adaptive values for one or more parameters. In an example for a retry value parameter, a determination that congestion or a level of congestion exists may lead to maintenance or a reduction of a retry limit, while a determination that congestion or a level of congestion does not exist may lead to maintenance or an increase of a retry limit. A determination that a traffic class or priority level is sufficiently time-sensitive (e.g. based on one or more thresholds) may lead to maintenance or an increase of a retry limit while a determination that traffic is not time-sensitive may lead to maintenance or a decrease in a retry limit.

Figure 6:
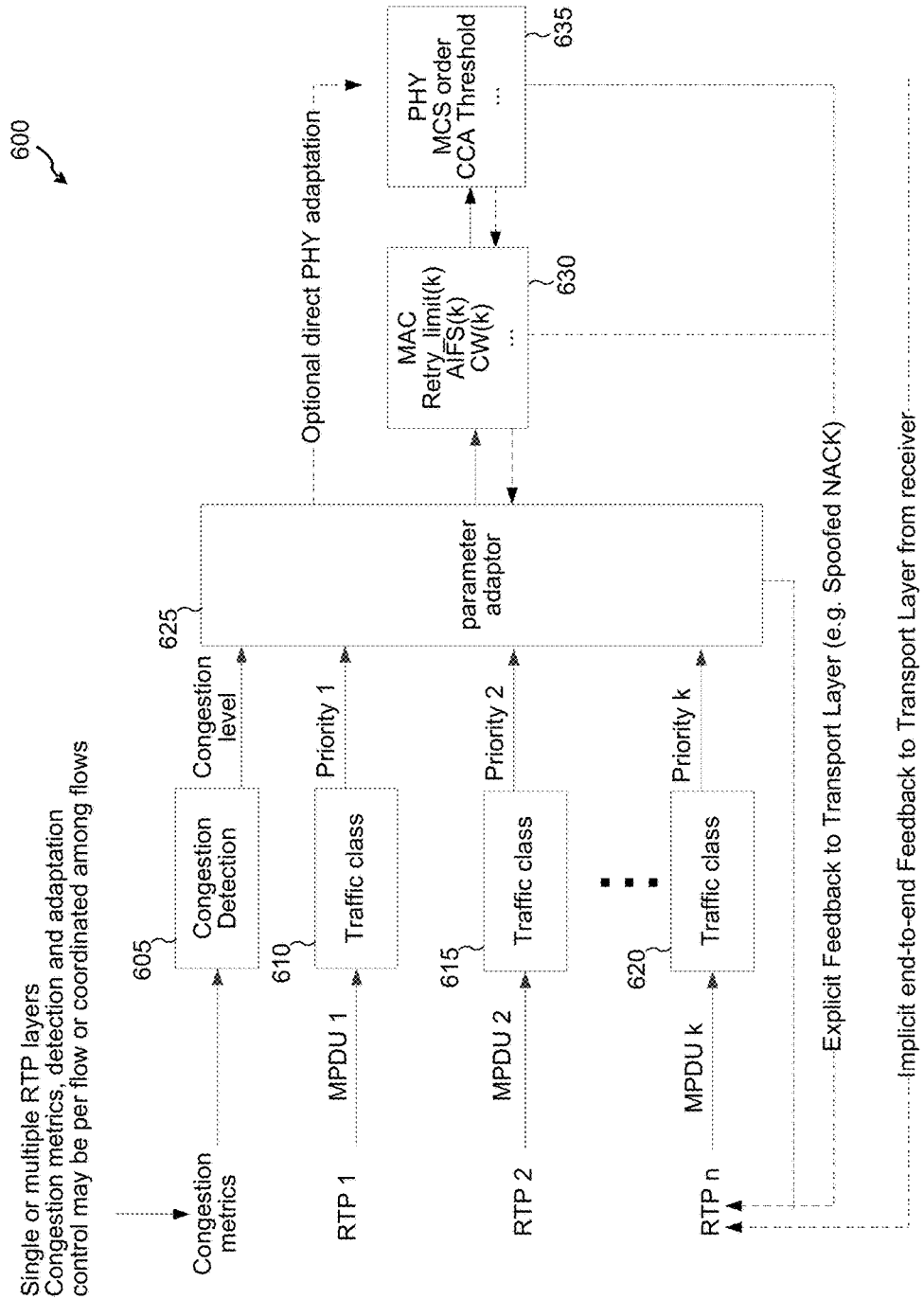
FIG. 6 illustrates an example associated with communication parameter adaptation.

FIG. 6 illustrates an example associated with communication parameter adaptation. Parameter adaptation 600 may be used, for example, to adapt parameters in communications, such as Wi-Fi channel communications. Parameter adaptation 600 is shown adapting one or more parameters (e.g. retry limit, AIFS, CW, MCS and/or CCA), although other implementations may adapt one or more and the same or different parameters using the same or different logic. Parameters may be in one or more layers, for example, in a device implementing an OSI model. For example, retry limit, AIFS and CW size parameters may be in a data link layer (e.g. a MAC sublayer in the data link layer) while MCS and CCA threshold parameters may be in a physical (PHY) layer. Parameter adaptation, which may include cross-layer parameter adaptation, may be coordinated, for example, by parameter adapter 625.

Congestion detection 605 may determine whether congestion exists or a level of congestion exists, e.g., based on one or more thresholds. Congestion detection 605 may determine a congestion level, for example, based on one or more congestion metrics. In an example, congestion detection 605 may determine whether congestion exists and/or a congestion level exists based on one or more MAC layer metrics, such as a queue size and/or a channel busy time. One or more metrics may be updated, e.g., periodically and/or upon request, for congestion detection. Congestion may be determined using one or more metrics for one or more flows in one or more channels. An Internet layer or protocol, such as real-time transport protocol (RTP) layer, may operate in higher layers, e.g., transport, network and/or application layers, to manage multimedia communication flows, e.g., RTP 1 managing MPDU 1 traffic flow, RTP 2 managing MPDU 2 traffic flow and RTP n managing MPDU k traffic flow, where each traffic flow may have its own priority. A congestion determination, e.g., a congestion level, may be provided to parameter adapter 625.

Traffic classification 610 may identify a class or priority of traffic for MPDU 1 traffic flow and provide a traffic priority level (e.g. Priority 1) to parameter adapter 625. Traffic classification 615 may identify a class or priority of traffic for MPDU 2 traffic flow and provide a traffic priority level (e.g. Priority 2) to parameter adapter 625. Traffic classification 620 may identify a class or priority of traffic for MPDU k traffic flow and provide a traffic priority level (e.g. Priority k) to parameter adapter 625.

Parameter adapter 625 may receive a congestion level and priority level(s), e.g., Priorities 1-$k$ for traffic flows MPDU 1-$k$. Parameter adapter 625 may adapt one or more parameters (e.g. retry limit, AIFS, CW, MCS and/or CCA), for example, per flow or in the aggregate, based on a congestion level and one or more priority levels Priority 1-$k$ for traffic flows MPDU 1-$k$. Parameter adapter 625 may apply one or more rules to adapt one or more parameters for traffic flows MPDU 1-$k$ based on a congestion level and priority levels Priority 1-$k$. Variables may counteract or support adaptive values for one or more parameters. Parameter adapter 625 may modify (e.g. increase or decrease) or maintain one or more communication (e.g. transmission) parameter values based on Congestion level and Priority 1-$k$ for traffic flows MPDU 1-$k$. Communication parameters subject to adaptation may be referred to as adapted or adaptable parameters (e.g., whether determined, modified or maintained).

Parameter adapter 625 may provide parameter information, e.g., indicating adapted parameter value(s), to one or more layers having adaptable parameters. Parameter adaptor 625 may provide parameter information to MAC layer 630, which may provide parameter information to PHY layer 635. Parameter adaptor 625 may provide parameter information to MAC layer 630 and to PHY layer 635. MAC layer 630 and/or PHY layer 635 may have direct and/or indirect bi-directional communication with parameter adapter 625.

Feedback may be provided, for example, to an Internet (e.g. RTP) layer, network layer and/or application layer directly or indirectly by one or more of a receiver (not shown), parameter adapter 625, MAC layer 630 and PHY layer 635. An RTP layer may use feedback to manage traffic flows. Feedback from a PHY layer may be feeding back information from PHY layer 635 to MAC layer 630, which may feed back the information provided by PHY layer 635 to an RTP layer. PHY layer 635 and MAC layer 630 may feed back information to parameter adaptor 635, which may feed the information back to an RTP layer. Feedback from a receiver (not shown) to an RTP layer may be referred to as end-to-end feedback. Feedback may be provided. Feedback within an entity, e.g., from one layer to another in a network entity, such as from MAC or PHY layers 630, 635 to Internet, network and/or application layers, or feedback from parameter adapter 625, may provide explicit internal feedback, which may spoof receiver feedback (e.g. spoof not acknowledge NACK).

MAC and/or PHY layer parameters may be adjusted to improve performance at the transport layer and/or the application layer. Congestion control mechanisms may be used at the transport and/or application layer. For example, a WebRTC application may use proactive and/or reactive packet loss mitigation techniques to implement congestion control. In a proactive technique, Forward Error Correction (FEC) may be applied to video frames and/or base-layer frames. FEC may be applied differently depending on a type of traffic. In an example, FEC may be applied to scalable video coding, but not to one or more other types of traffic.

A reactive technique may be based on end-to-end feedback. Relying, partially or wholly, on end-to-end feedback may or may not be effective, for example, depending on traffic, such as traffic having a large round-trip time (RTT). In a reactive technique, a video encoder may encode a future video frame as an intra-coded frame (I-frame) upon receiving frame-loss feedback. Generating an I-frame for each frame loss may increase the video bit rate, which may result in network congestion and/or poor video quality (e.g. where the video bitrate is fixed). Frames after an initial lost frame and before a new I-frame may suffer from quality degradation (e.g. in the form of artifacts or video freeze), which may last approximately one RTT. An RTP layer at the sender may retransmit a lost RTP packet upon receiving packet-loss feedback from a receiver. However, RTT for retransmission responsive to packet loss feedback may affect video quality. RTT may, for example, range from 50 ms to 700 ms or more. An end-to-end reactive approach may lead to long durations of artifacts and/or freezing in decoded video.

In an example, a reactive technique, for example one used for real-time video applications, may be referred to as early packet loss feedback (EPLF). A reactive technique may take advantage of a likelihood that a Wi-Fi link may be the location of packet loss and that such a loss may be detected by the MAC layer of a sender. A MAC layer may feed back (e.g. directly) loss information to an application layer (e.g. RTP layer for a WebRTC application), for example, when a packet loss is due to channel error. Loss information may, for example, comprise a spoofed negative acknowledgement (NACK), such as an RTP Control Protocol (RTCP) packet for a WebRTC application. A spoofed NACK may permit an application layer to retransmit a lost packet immediately, or at least sooner than in response to an actual NACK. A MAC layer may do nothing, for example, when a packet loss is due to congestion, e.g., to prevent concealing packet loss from a congestion control algorithm implemented at a higher layer.

Congestion may be detected and may be distinguished from other network conditions such as channel error using one or more congestion metrics. In an example, congestion may be detected, e.g., on a Wi-Fi channel, based on a smoothed queue size. In an example, smoothed queue size may be given by Eq. (1):

$$\hat{q}(i)=\alpha \hat{q}(i-1)+(1-\alpha)q(i) \qquad (1)$$

In Eq. (1), q(i) may be an instantaneous queue size sampled at time i$\Delta$T with T being a sampling period. In an example, a network condition that caused packet loss may be determined to be congestion, for example, when $\hat{q}(i) \geq \beta Q$, where Q may be a full MAC queue size and $\beta \in [0,1]$ may be a configurable threshold. A network condition may be determined to be channel error, for example, when it is not determined to be congestion.

In an example, congestion may be detected, e.g., on a Wi-Fi channel, based on channel busy time. In an example, channel busy time fraction (CBTF) may be given by Eq. (2):

$$c(i)=n(i)/m(i) \qquad (2)$$

In Eq. 2, c(i) may be CBTF. CBTF may be defined as a fraction of time during which a channel is busy within a given time interval. A channel may be considered busy, for example, when measured signal power is greater than a Clear Channel Assessment (CCA). A MAC layer may measure the signal power m(i) times in the ith time interval. Out of m(i) measurements, n(i) of them may be greater than CCA. In an example, a network condition that caused packet loss may be determined to be congestion, for example, when c(i)>$\gamma$, where $\gamma \in [0,1]$ may be a configurable threshold. A network condition may be determined to be channel error, for example, when it is not determined to be congestion.

Figure 7:
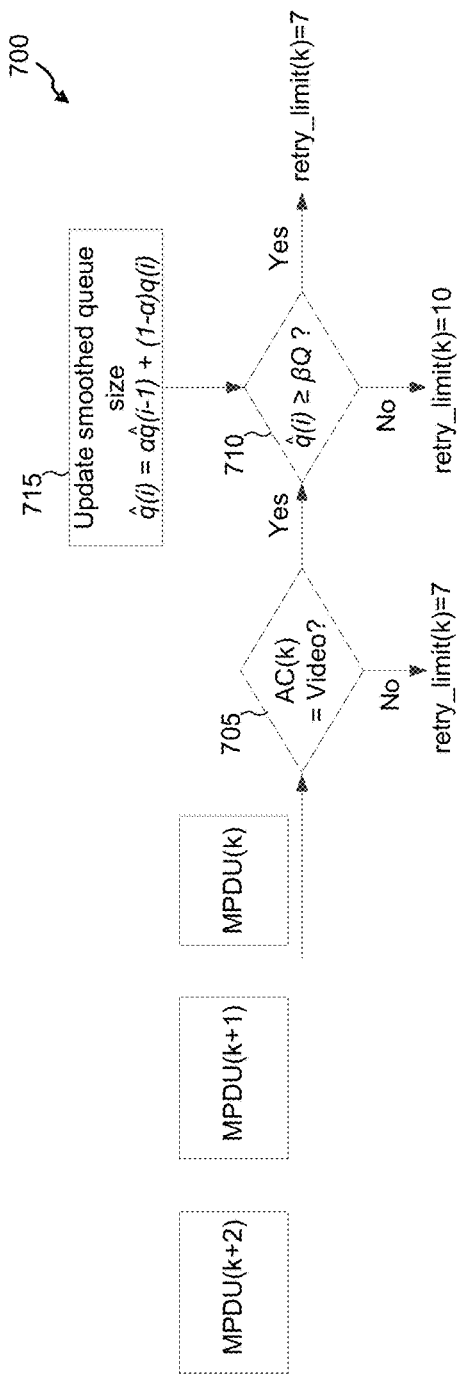
FIG. 7 illustrates an example associated with parameter adaptation based on congestion detected using queue size.

FIG. 7 illustrates an example associated with parameter adaptation based on congestion detected using queue size. Exemplary parameter adaptation 700 may use a network condition (e.g. channel congestion, channel error) and/or a traffic type or priority, for example, to adapt a retry limit parameter. Parameter adaptation 700 is shown adapting a parameter (e.g., retry limit); other implementations may adapt one or more and the same or different parameters using the same or different logic.

Traffic type or priority determination 705 determines an access category (AC) of traffic MPDU(k), where MPDU(k) may represent the kth MPDU. The determination may be made by a MAC layer. An AC may indicate a type of traffic, which may have an associated priority. In an example, traffic type or priority determination 705 may determine whether traffic MPDU(k) comprises video. In an example, a value (e.g. a default value) of seven (7) may be assigned to the retry limit for MPDU(k), e.g., retry_limit(k)=7, for non-video traffic. In an example, the assignment for a non-video type or priority of traffic may occur regardless of congestion or channel error.

In an example, video traffic retry limit parameters may depend on a network (e.g. a channel) condition, such as congestion. Congestion detection 710 determines whether congestion exists or not, e.g., based on a threshold. Congestion detection 710 may determine a level of congestion, e.g., based on a plurality of thresholds for a plurality of congestion levels, where one or more parameters may be adapted differently based on one or more levels of congestion. Congestion detection 710 may be determine congestion based on a smoothed queue size. Congestion detection may determine congestion based on one or more metrics. Smoothed queue size update 715 may update smoothed queue size, for example, continuously, perodically or aperiodically. In an example, a value (e.g. a default value) of seven (7) may be assigned to the retry limit for MPDU(k), e.g., retry_limit(k)=7, for example, when $\hat{q}(i) \geq \beta Q$. Without congestion, an increased value (e.g. a value of 10) may be assigned to the retry limit for MPDU(k), i.e., retry_limit(k)= 10.

Figure 8:
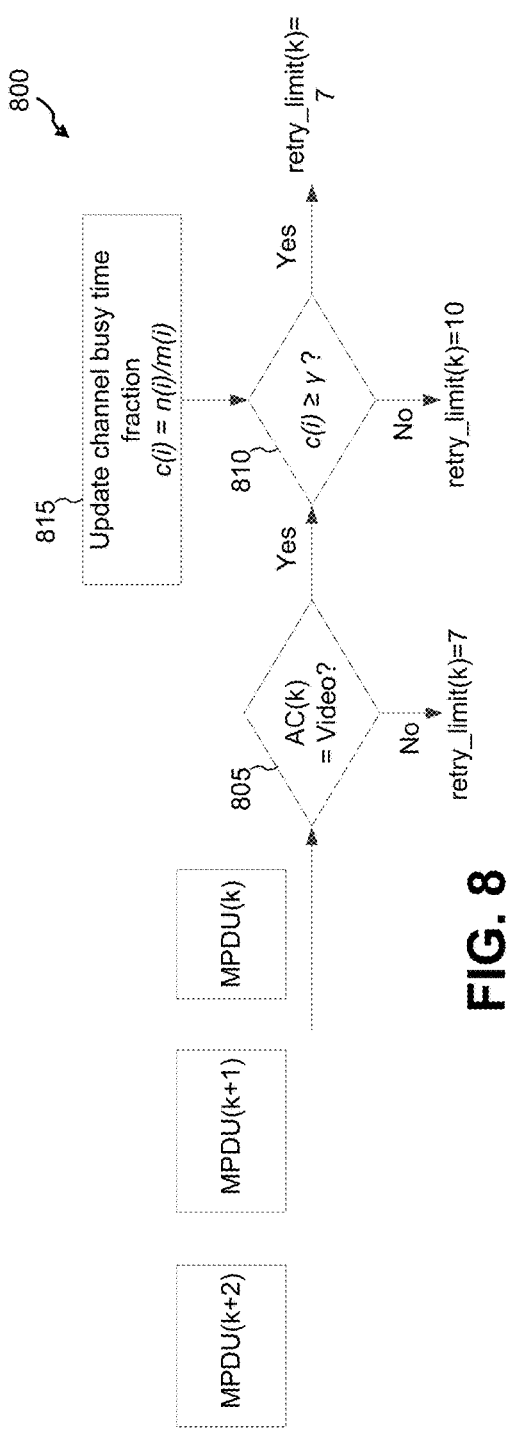
FIG. 8 illustrates an example associated with parameter adaptation based on congestion detected using channel busy time.

FIG. 8 is a block diagram of an example of parameter adaptation based on congestion detected using channel busy time. Exemplary parameter adaptation 800 may use a network condition (e.g. channel congestion, channel error) and/or a traffic type or priority, for example, to adapt a retry limit parameter. Parameter adaptation 800 is shown adapting a parameter (e.g., retry limit); other implementations may adapt one or more and the same or different parameters using the same or different logic.

Traffic type or priority determination 805 determines an AC of traffic MPDU(k), where MPDU(k) may represent the kth MPDU. The determination may be made by a MAC layer. An AC may indicate a type of traffic, which may have an associated priority. In an example, traffic type or priority determination 805 determines whether traffic MPDU(k) comprises video. In an example, a value (e.g. a default value) of seven (7) may be assigned to the retry limit for MPDU(k), e.g., retry_limit(k)=7, for non-video traffic. In an example, the assignment for a non-video type or priority of traffic may occur regardless of congestion or channel error.

In an example, video traffic retry limit parameters may depend on a network (e.g. a channel) condition, such as congestion. Congestion detection 810 determines whether congestion exists or not, e.g., based on a threshold. Congestion detection 810 may determine a level of congestion, e.g., based on a plurality of thresholds for a plurality of congestion levels, where one or more parameters may be adapted differently based on one or more levels of congestion. Congestion detection 810 may determine congestion based on CBTF. Congestion detection 810 may determine congestion based on one or more metrics. CBTF update 815 may update CBTF, for example, continuously, perodically or aperiodically. In an example, a value (e.g. a default value) of seven (7) may be assigned to the retry limit for MPDU(k), e.g., retry_limit(k)=7, for example, when c(i)>$\gamma$, where $\gamma \in [0,1]$ may be a configurable threshold. Without congestion, an increased value (e.g. a value of 10) may be assigned to the retry limit for MPDU(k), i.e., retry_limit(k)=10.

Figure 9:
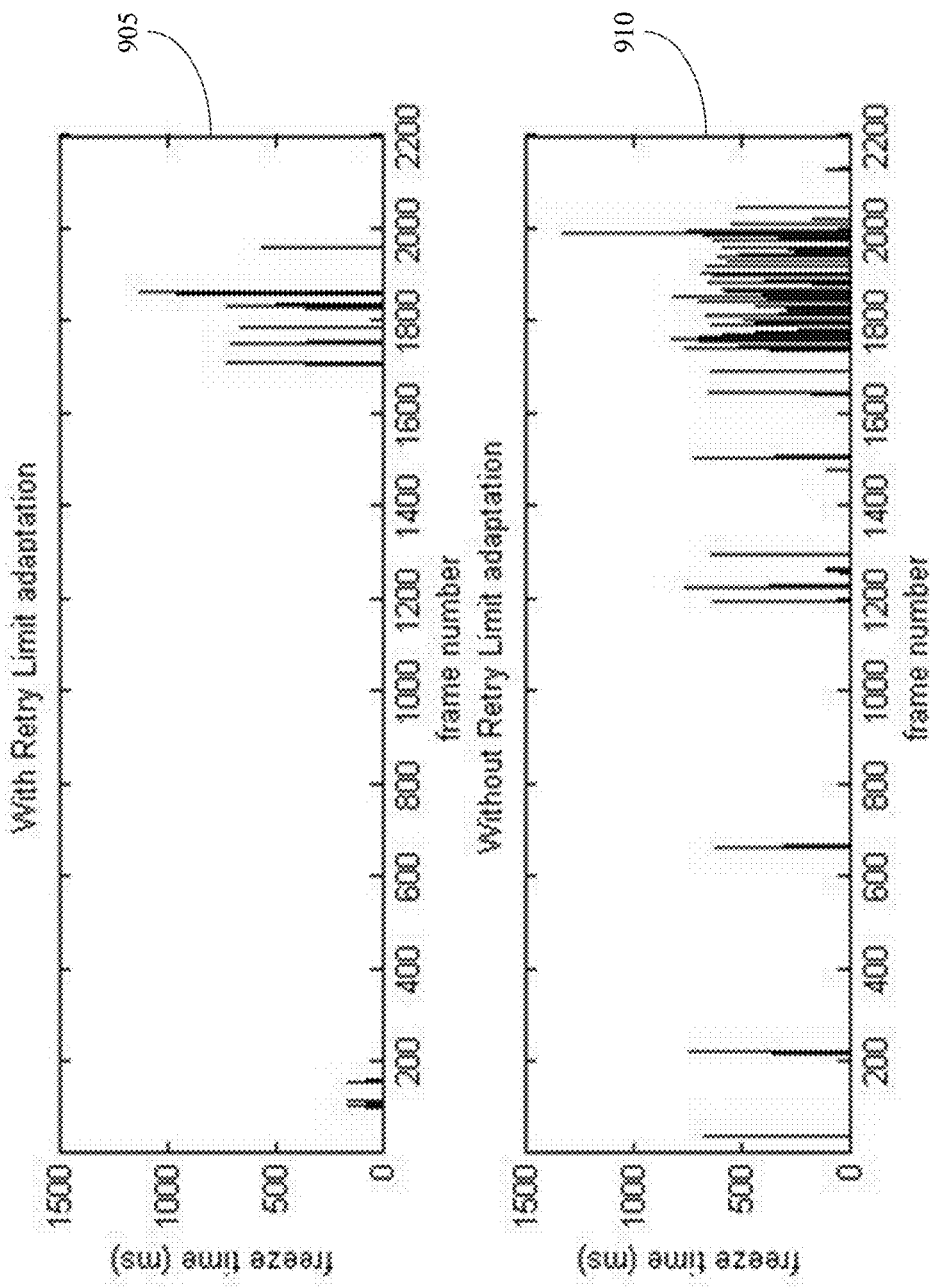
FIG. 9 illustrates an example comparing video freeze time with and without parameter adaptation.

FIG. 9 shows graphical illustrations of an example comparing video freeze time with and without parameter adaptation. Parameter adaptation graph 905 illustrates an example of freeze times for each frame for the case of adapting a retry limit parameter according to FIG. 7. Graph 910 illustrates an example of freeze times for each frame without adapting a retry limit parameter. A comparison of graphs 905, 910 shows that retry limit adaptation may reduce (e.g. significantly reduce) freeze time.

Theoretical analyses and prototype-based experimental results have shown that the disclosed subject matter may reduce or eliminate channel-caused negative effects, such as video freezing in a decoded video, while improving the effectiveness of a congestion control algorithm that may be used at the transport and/or application layer. Disclosed subject matter may be adapted for use in cellular networks.

In an example, one or more parameters (e.g. a retry limit parameter) may be adapted so that (i) when there is no congestion, packet losses on a wireless link may be resolved locally using additional retransmissions, and (ii) when there is congestion, the effect of packet losses on a wireless link may be detected transparently by a video receiver that may report an RTP packet loss rate to the video sender for appropriate congestion control.

Transmission of a MAC Protocol Data Unit (MPDU) may fail, for example, when a sender does not receive an acknowledgement (ACK) after a maximum number of retransmissions, e.g., based on a retry limit. Otherwise, a transmission may succeed.

In an example, a sender may generate a spoofed NACK packet at a MAC layer and may transmit the spoofed NACK packet to its own application layer (e.g. to an RTP application), for example, when the cause of a transmission failure is determined to be channel error. The MAC layer may determine the application layer packets (e.g. RTP packets) that have been lost, e.g., using deep packet inspection. The MAC layer may inspect the payload of the MPDU, which may be an IP packet, and may determine whether the IP packet carries a transport layer packet (e.g. a UDP packet or TCP packet) that in turn carries an application layer packet (e.g. RTP or RTCP packet) having a Payload Type (PT) field that indicates a payload type (e.g. video payload type). The MAC layer may determine the source IP address, the destination IP address, and the application layer packet sequence number. The MAC layer may determine or acquire the 5-tuple for the associated packet flow (e.g. previously stored as described herein) that has matching IP addresses. Sender and receiver IP addresses of an analyzed IP packet may be reversed as compared to the stored sender and receiver IP addresses. A MAC layer may determine or acquire the port numbers and the source identifier (e.g. SSRC) from the 5-tuple. The MAC layer may build a NACK packet and may send it to the sender's own Internet layer, which may pass the NACK packet to the sender's application layer. The application layer at the sender may retransmit the lost application layer packet(s), for example, upon receiving the spoofed NACK packet. In an example, no action may be taken, for example, when the cause of a transmission failure is determined to be congestion.

A sender may react to packet loss feedback in a variety of ways. For example, a video sender may insert an I-frame in a video bit stream or may retransmit lost packets. RTP layer retransmission may result in better video quality and less traffic load, for example, for low packet loss rate cases. Although I-frame insertion may stop error propagation, it may not help the quality of the frame to which the lost packet(s) belongs, and therefore may lead to frozen video or one or more frames with artifacts. With early feedback, RTP layer retransmission may deliver lost packets while causing a slight change in the delay jitter that may be absorbed by a dejitter buffer, which may reduce or eliminate video freezes. With RTP layer retransmission, the additional traffic injected into the network may be the retransmitted RTP packet. The additional traffic may be the difference between the size of an I-frame and that of a P-frame (e.g. when an I-frame is sent instead of a P-frame), which difference may be larger than that of a retransmitted RTP packet. Similar effects may achieved, for example, using implementations of disclosed subject matter in other video and non-video implementations.

Application layer retransmission with early feedback may be more efficient than Forward Error Correction (FEC), for example, in implementations that may have stringent latency requirements. In an example video implementation, a packet loss rate may be represented by p, the maximum rounds of EPLF allowed for an RTP packet may be K≥1 and the latency for a single round of EPLF may be $t_{local}$, which may be on the order of milliseconds. An RTP-layer retransmission may have an average communication overhead given by Eq. (3), an average latency given by Eq. (4) and a packet delivery ratio given by Eq. (5):

$$\sum_{i=1}^{K} ip^{i-1}(1-p) - 1 < \sum_{i=1}^{\infty} ip^{i-1}(1-p) - 1 = p/(1-p) \quad (3)$$

$$\sum_{i=1}^{K} ip^{i-1}(1-p)t_{local} < \sum_{i=1}^{\infty} ip^{i-1}(1-p)t_{local} = t_{local}/(1-p) \quad (4)$$

$$1 - p^K \quad (5)$$

FEC may be performed among application layer packets of a same frame or among the application layer packets of multiple frames. A single frame FEC scheme may have a latency comparable to application layer retransmission, where overhead may be determined by the size of a frame in RTP packets. In an example with a bit rate of 2 Mbps, an MTU of 1500 bytes and a frame rate of 15 frames per second (fps), a frame may comprise less than 12 packets while the overhead of a single-frame FEC implementation may not be lower than $1/12$. In an example with a packet loss rate of 0.34% in a Wi-Fi network, the overhead of application layer retransmission may be less than 4% of that of single-frame FEC.

Packet loss rate may play an important role in congestion control of an application such as WebRTC. A receiver may report an RTP packet loss rate or fraction lost in a Receiver Report (RR) to a sender, which may indicate two rates (one of which may be a TCP-friendly rate) that depend on the packet loss rate. A receiver may calculate a Receiver Estimated Maximum Bitrate (REMB), for example, based on the average delay jitter, and may send the REMB to the sender. A sender may form the allowed maximum sending rate from these, e.g., three, rates.

In some applications, such as WebRTC, a packet loss may be considered a signal of network congestion. While this may be a reasonable assumption for wired networks, it may not hold for wireless networks where a packet loss may be caused by multiple sources, e.g., network congestion or channel error. Channel-caused and congestion-caused packet losses on the sender's wireless link may be distinguished. Channel-caused packet loss may be hidden from application or transport layer congestion control algorithms, for example, by sending a spoofed NACK that triggers an application or transport layer retransmission. This may cause the receiver to believe that the packet loss did not happen, which may mean the receiver may not report the packet loss to the sender. Unnecessary reductions in the sending rate may be avoided, thereby improving the performance of congestion control.

A channel-caused packet loss and a congestion-caused packet loss may be distinguished using a variety of techniques. For example, channel busy time and/or inter-arrival times at a receiver may be used to measure congestion. A smoothed queue size may be used as a metric that is more directly related to congestion. Congestion may occur, for example, when the traffic arrival rate persistently exceeds the service rate. The service rate to a STA may be the share of medium time (which may take into account contention and collision) multiplied by a data rate supported by a channel condition. Queue overflow or a large queue size may provide a clear indication of congestion. Queue overflow or large size conditions may occur, for example, when the service rate cannot keep up with the arrival rate. Rapid changes in the instantaneous queue size may occur, for example, due to bursty traffic or sudden decreases in the service rate. Instantaneous queue size may be smoothed, e.g., as described herein, for a more reliable metric.

EPLF in a real-time video implementation and video freeze duration modeling may support understanding of the disclosed subject matter. In an example, isolated packet losses may be far apart, such that subsequent losses occur after the previous loss is recovered. A default error concealment technique of WebRTC, for example, is a type of frame copy where the video freezes at the previous frame when the current frame may not be able to be perfectly reconstructed before the scheduled display deadline. The extra amount of time for which the previous frame is displayed may be the duration of the video freeze.

The duration of a video freeze may be calculated, for example, based on (i) the time taken for each RTP packet to travel from the sender to the receiver, (ii) the feedback delay for each RTP packet loss, (iii) the playout delay (e.g. the difference between the time when a video frame is generated at the video sender and the time when the video frame must be displayed at the video receiver), (iv) the video decoding delay and (v) the video rendering delay. Such an analysis may be complicated without providing much insight. A simplified calculation may be used, for example, where these parameters are assumed to be constants.

The playout delay may be designated $T_{playout}$, the delay for an RTP packet to travel from the sender to the receiver may be designated $T_{oneway}$, the packet loss feedback delay may be designated $T_{feedback}$, the frame rate may be designated f, the per-frame decoding delay may be designated d, and the per-frame rendering delay may be designated r. A relationship may be designated as $T_{playout} > T_{oneway} + d + r$.

A freeze may comprise multiple parts, e.g., a deadline missing delay designated $\tau_1$ and a catchup delay designated $\tau_2$, which may be used to decode backlogged video frames. A freeze may be represented by Eq. (6):

$$\tau = \tau_1 + \tau_2 \qquad (6)$$

The deadline missing delay $\tau_1$ may be the difference between the arrival time of the retransmitted RTP packet and the time at which the video decoder needs to start decoding the corresponding frame in order to meet the display deadline. The deadline missing delay $\tau_1$ may be represented by Eq. (7):

$$\tau_1 = \max(T_{oneway} + T_{feedback} - (T_{playout} - d - r), 0). \qquad (7)$$

Video freeze may not occur, for example, when $\tau_1 = 0$. Otherwise, video freeze may occur and any freeze may comprise a decoding catchup delay $\tau_2$ because, upon receiving the retransmitted RTP packet, a video decoder may decode a video frame to which the retransmitted RTP packet belongs and the subsequent frames until decoding catches up with displaying. An inter-frame arrival time may be denoted as $T_{frame} = 1/f$. The number of frames received during $\tau_1$ may be $\tau_1/T_{frame}$, which frames may need to be decoded. The additional number of frames that may need to be decoded may be denoted as $\tau_2/T_{frame}$. The catchup delay $\tau_2$ may be represented by Eq. (8):

$$(\tau_1/T_{frame})d + (\tau_2/T_{frame})d = \tau_2, \qquad (8)$$

Eq. (7) may be simplified into Eq. (9):

$$\tau_2 = \tau_1 d/(T_{frame} - d), \qquad (9)$$

Eq. (6) together with Eq. (7) and Eq. (9) yield Eq. (10):

$$\tau = \begin{cases} 0, & \text{if } T_{oneway} + T_{feedback} + d + r \leq T_{playout}; \\ (T_{oneway} + T_{feedback} + d + r - T_{playout}) \times \\ \quad (1 + d/(1/f - d)), & \text{otherwise} \end{cases} \qquad (10)$$

Given the relationship $T_{playout} > T_{oneway} + d + r$, it follows that video freeze may be avoided, for example, when $T_{feedback}$ is a sufficiently short duration. Video freeze may be avoided, for example, when EPLF communications occur within the same device. The disclosed subject matter, including analyses, may be applicable to other error concealment techniques. For example, a video freeze duration may be interpreted as a duration of video artifacts, for example, when a video decoder continues decoding when there is a packet loss and re-decodes imperfectly decoded frames when a retransmission arrives. The remaining catchup time due to a previous loss when a current loss occurs may be considered, for example, in a case of non-isolated losses.

Network or channel communication performance may be improved by adapting one or more communication parameters (e.g. retry limit, AIFS, CW size, MCS order and/or CCA threshold) for one or more layers (e.g. MAC and PHY layers) based on network or channel conditions (e.g. channel congestion levels, channel errors), traffic types and/or traffic priority levels.

A retry limit parameter, e.g., in a MAC layer, may be adaptable to network conditions, e.g., link conditions such as channel congestion and/or channel error, traffic types and/or traffic priorities. Retry limit adaptation may be used in MAC adaptation techniques and may improve the performance of a higher layer congestion control algorithm. In an example, occupancy on a channel may be reduced, which may allow for improved higher layer congestion control, for example, by reducing the number of retries. A PHY layer may transmit with an MCS order of $m_1$, a probability of bit error $P_{c1}$, a packet length of N, and $R_1$ retries. A packet error rate $P_{P1}$ may be approximated in accordance with Eq. (11):

$$P_{P1} = [1 - (1 - P_{c1})^N]^{R_1} \qquad (11)$$

Channel occupancy may be reduced, for example, by reducing the retry limit $R_1$ to $R_2$. The packet error rate $P_{P2}$ may be approximated in accordance with Eq. (12):

$$P_{P2} = [1 - (1 - P_{c1})^N]^{R_2} \qquad (12)$$

Packet error rate $P_{P1}$ may be less than packet error rate $P_{P2}$.

An MCS parameter, e.g., in a PHY layer, may be adaptable to network conditions, e.g., link conditions such as channel congestion and/or channel error, traffic types and/or traffic priorities. MCS adaptation may be used in PHY adaptation techniques and may improve the performance of a higher layer congestion control algorithm. In an example, the occupancy on a channel may be reduced, which may allow for improved higher layer congestion control, by increasing the MCS order. An increase in the MCS order (e.g. subject to the maximum MCS supportable by the physical channel) may reduce redundancy of a transmitted signal, which may reduce the channel occupancy. The MCS order transmitted may be selected to be supportable by the physical channel. A PHY layer may transmit with an MCS order of $m_1$, a probability of bit error $P_{c1}$, a packet length of N, and $R_1$ retries. A packet error rate $P_{P1}$ may be approximated in accordance with Eq. (13):

$$P_{P1} = [1 - (1 - P_{c1})^N]^{R_1} \qquad (13)$$

Channel occupancy may be reduced, for example, by increasing MCS order $m_1$ to an MCS order of $m_2$, with a probability of bit error $P_{c2}$. A packet error rate $P_{P2}$ may be approximated in accordance with Eq. (14):

$$P_{P2}=[1-(1-P_{c2})^N]^{R1} \quad (14)$$

Packet error rate $P_{P1}$ may be less than packet error rate $P_{P2}$.

PHY layer MCS adaptation may be enabled, for example, to select a best MCS order for a physical channel based on, for example, a Packet Error Rate target (e.g. 10%). The MAC layer may signal the PHY layer to modify a selected MCS, for example, when the MAC layer detects congestion in the channel. Such signaling may be accomplished, for example, via one or more of sending a signal to the PHY layer to adjust its Packet Error Rate target to a higher value (e.g. 15%), and sending a signal to change the MCS order, for example to $R_2$. A signal may be sent to the PHY layer to adjust its MCS order to the next highest MCS order in the system (e.g. $m_2$). The signal from the MAC layer to the PHY may be used, for example, to override a PHY layer adaptation algorithm or as a suggestion that the PHY layer use the signaled change. The PHY layer may determine whether to make a change, for example, based on whether a suggested MCS is supported. The signal from the MAC may become an extra constraint or parameter on a PHY layer adaptation algorithm.

A CW parameter, e.g., in a MAC layer, may be adaptable to network conditions, e.g., link conditions such as channel congestion and/or channel error, traffic types and/or traffic priorities. In an example, IEEE 802.11 may use a contention window size CW that may allow a STA or AP to choose a backoff time uniformly drawn from the internal [0, CW]. The value of CW may be doubled, for example, when (e.g. every time) there is an additional collision until reaching a maximum value $CW_{max}$. In an example, CW may be adapted based on congestion. For example, $CW_{max}$ may be adapted based on a congestion level in accordance with Eq. (15):

$$CW_{max}[AC,\text{state}]=b[AC]2^{I(\text{state})} \quad (15)$$

where b[AC] may be an integer depending on (e.g. only on) the AC. I(state) may be equal to one (1), for example, when there is congestion; otherwise, I(state) may be equal to zero (0). In an example, b[AC] may be assigned values shown in Table 1, where $aCW_{max}$ and $aCW_{min}$ may be constants, with $aCW_{max}>aCW_{min}$, the value of which may depend on the PHY layer implementation. In an example implementation, $aCW_{max}$ may be equal to 1023 while $aCW_{min}$ may be equal to 31.

TABLE 1

Example of AC values.

| AC | b[AC] |
|---|---|
| Back ground | $aCW_{max}$ |
| Best Effort | $aCW_{max}$ |
| Video | $aCW_{min}$ |
| Audio | $(aCW_{min} + 1)/2 - 1$ |

An AIFS parameter, e.g., in a MAC layer, may be adaptable to network conditions, e.g., link conditions such as channel congestion and/or channel error, traffic types and/or traffic priorities. In an example, AIFS may be determined in accordance with Eq. (16):

$$AIFS[AC]=AIFSN[AC]\times a\text{SlotTime}+a\text{SIFSTime} \quad (16)$$

where aSlotTime may represent the duration of a first time interval and aSIFSTime may represent the duration of a second time interval. AIFS may be adapted, for example, by modifying AIFSN. In an example, AIFS and/or AIFSN may be adapted based on a congestion level in accordance with Eq. (17):

$$AIFS[AC,\text{state}]=AIFSN[AC,\text{state}]\times a\text{SlotTime}+a\text{SIFSTime} \quad (17)$$

where AIFSN[AC, state] may be determined, for example, in accordance with Eq. (18):

$$AIFSN[AC,\text{state}]=a[AC]+(1-I(\text{state}))K \quad (18)$$

In Eq. (18), K may be a positive integer, I(state) may be equal to zero (0) when the channel is in the state of congestion and I(state) may be equal to one (1) when the channel is not in a state of congestion. In an example, a[AC] may be a positive integer depending (e.g. only depending) on the priority of the MPDU. Table 2 shows an example set of values for a[AC].

TABLE 2

Example of AC values.

| AC | a[AC] |
|---|---|
| Back ground | 7 |
| Best Effort | 3 |
| Video | 2 |
| Audio | 2 |

A clear channel assessment (CCA) threshold parameter, e.g., in a PHY layer, may be adaptable to network conditions, e.g., link conditions such as channel congestion and/or channel error, traffic types and/or traffic priorities.

A modification of a CCA threshold may be used in PHY adaptation techniques, for example, with channel congestion as an input. A CCA threshold may facilitate a node determining whether a channel is clear. An increase in the CCA threshold may make a node more aggressive in accessing a channel (e.g. by increasing its transmission priority). A reduction in the CCA threshold may make a node less aggressive in accessing a channel (e.g. by reducing its transmission priority). In an example, a CCA threshold may be adapted, for example, based on a congestion level and a traffic class. A higher value may be assigned to a CCA threshold associated with higher priority traffic. When congestion is detected, A lower CCA threshold may be assigned, for example, to limit the amount of new traffic to be injected into the network to reduce congestion.

A CCA value for MPDU(k) may be calculated, for example, in accordance with Eq. (19):

$$CCA(k)=CCA_{min}+\delta(1-0.5I(\text{state}))\text{priority}(k) \quad (19)$$

where $CCA_{min}$ may represent a noise floor (e.g. -85 dBm), $\delta$ may be a constant (e.g. 3), I(state) may be an indicator function taking a value of 1, for example, when a congestion detection algorithm concludes that there is congestion (i.e. state=congestion) and taking a value 0 otherwise, and priority(k) may be a function indicating the importance of MPDU(k). The function priority(k) may, for example, be assigned values 0, 1, ..., H, where 0 may represent the least importance or lowest priority and H may represent the most importance or the highest priority. A congestion detection may be based on a smoothed queue size, CBTF and/or other metric, e.g., as described herein.

Cross layer congestion-based parameter adaptation may be utilized to improve performance. Adaptation may be performed individually and collectively for communication parameters spanning multiple layers (e.g. MAC and PHY layer parameters). Cross-layer coordination may, for example, improve, maximize or optimize throughput when there is no congestion and may pass packet losses to an application and/or transport layer transparently when there is congestion. A retry limit may be jointly optimized at a MAC layer while MCS may be jointly optimized at the PHY layer. A retry limit may be represented by m, the rate corresponding to a selected MCS may be represented by r, the channel capacity of a channel (which may be assumed to be additive white Gaussian noise (AWGN)) may be represented by C, and packet length may be represented by n symbols. A packet loss probability may be given, for example, by Eq. (20):

$$\epsilon = Q\left(\frac{C-r}{\sqrt{\left(1-\frac{1}{(1+SNR)^2}\right)\frac{1}{n}\log_2 e}}\right) \quad (20)$$

where Q may be defined as $$Q(x) = \int_x^\infty \frac{1}{\sqrt{2\pi}} e^{-\frac{t^2}{2}} dt,$$

SNR may be the signal-to-noise ratio, and $C=\log_2(1+SNR)$. An expected value of the throughput may be given by Eq. (21):

$$T = \frac{E[S]}{E[D]} \quad (21)$$

where S may be the number of information bits sent (e.g. successfully) and D may be the duration of the transmission, which may include packet transmission time and/or backoff delay in channel access.

In an example, E[S] and E[D] may be determined as follows. A retry limit may be K+1 and a coding rate may be r. E[S] may be given by Eq. (22):

$$E[S] = \sum_{k=1}^{K+1} \epsilon^{k-1}(1-\epsilon)nr = (1-\epsilon^{K+1})nr \quad (22)$$

A transmission time of a packet may be given by Eq. (23):

$$t = nt_s + \tau \quad (23)$$

where $\tau$ may be the packet header and is (in seconds) may be the symbol duration. A transmitter may back off in the event of a transmission failure. A backoff time may be uniformly chosen in a time interval $[0, b_i]$, where $b_i$ may be equal to $2^{i-1}b$ and b may represent a time duration and i=1, 2, 3, . . . E[D] may be given by Eq. (24):

$$E[D] = \quad (24)$$
$$\sum_{k=1}^{K+1} \epsilon^{k-1}(1-\epsilon)\left(kt + \frac{1}{2}\sum_{i=1}^{k} 2^{i-1}b\right) + \epsilon^{K+1}\left((K+1)t + \frac{1}{2}\sum_{i=1}^{K+1} 2^{i-1}b\right)$$

where the ½ factors may be provided, for example, based on a uniform distribution of backoff times. An expected throughput T may be calculated according to Eq. (21), for example, by substituting Eq. (22) and Eq. (24) for E[S] and E[D] in Eq. (21). An expected throughput may be a function of K, n and r. Numerical methods may be used to find the triple (K, n, r) that maximizes throughput T.

An optimal MCS and retry limit may be determined, for example, using a theoretical model to calculate an expected throughput as a function of a channel code rate and retry limit in the form of a sequence of triples, e.g., expected_throughput (i,k), channel_code_rate(i), retry_limit(k), where i represents the ith value for the channel code rate and k represents the kth retry limit. In an example, i=i' and k=k' may be identified with the highest value of the expected throughput. An MCS with an effective channel code rate closest to channel_code_rate (i') may be selected and retry_limit(k') may be selected. Packet length (e.g. by changing the blocklength n) may be part of the optimization, for example, by forming a sequence of tuples, such as expected_throughput(i, k, j), channel_code_rate(i), retry_limit(k) and block_length(j), where i may represent the ith value for the channel code rate, k may represent the kth retry limit and j may represent the jth blocklength.

A sequence of triples in the form of expected_throughput (i,k), MCS(i), retry_limit(k) may be constructed experimentally or via simulation. In an example, i=i' and k=k' may be identified such that expected_throughput (i',k') may be greater than expected_throughput(i,k) for i≠i' and k≠k'. An optimal MCS may be MCS (i') and the optimal retry limit may be retry_limit(k'). Blocklength may be optimized, for example, by building a sequence of tuples, such as expected_throughput (i, k, j), MCS(i), retry_limit(k) and block_length(j).

Communication parameter adaptation may be applied to different kinds or types of traffic, e.g., video streaming traffic. Video streaming is an application used over a network (e.g. the Internet). A last hop for video streaming traffic may be over a wireless link such as Wi-Fi or LTE, for example. Video streaming may use rate adaptive streaming (e.g. Dynamic Adaptive Streaming over HTTP (DASH) and HTTP Live Streaming (HLS)) and/or progressive downloading (e.g. as used by some Internet sites providing video to mobile devices). There may be a difference (e.g. an exploitable difference) between adaptive streaming and progressive downloading techniques. Rate adaptive streaming may adopt video bit rate adaptation during a video session. Progressive downloading may use a fixed bitrate throughout a video session.

It may be desirable to prioritize progressive download traffic over adaptive streaming traffic during congestion, for example, by using a higher retry limit value for progressive download traffic. Without such prioritization, rebuffering may occur, for example, because a rate requested by an associated video application may not adapt to a lower value when network conditions deteriorate.

A determination may be made whether an MPDU carries progressive download packets. Adaptable MAC-layer parameters may be assigned values that favor the transmission of an MPDU carrying progressive download packets.

Figure 10:
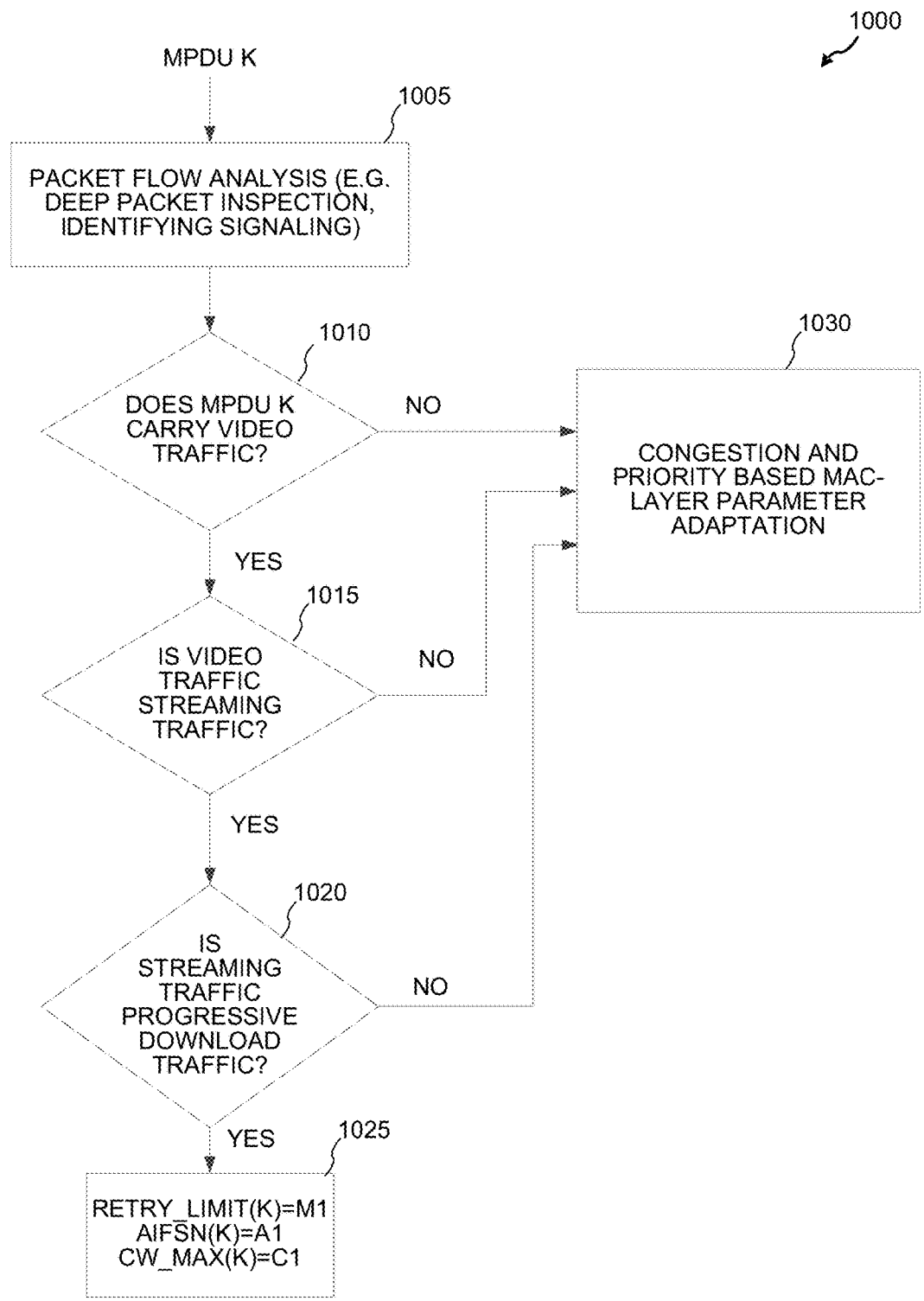
FIG. 10 illustrates an example associated with parameter adaptation for different types of traffic.

FIG. 10 illustrates an example parameter adaptation 1000 for different types of traffic. A packet flow analysis 1005 may be performed, for example, by performing a deep packet inspection and/or identifying signaling for traffic flow MPDU k. A determination 1010 may be made whether MPDU k carries video traffic. Congestion and priority based MAC-layer parameter adaptation 1030 may be performed (e.g. as described herein), for example, when MPDU k does not carry video traffic. A determination 1015 may be made whether video traffic carried by MPDU k comprises streaming traffic. Congestion and priority based MAC-layer parameter adaptation 1030 may be performed, for example, when MPDU k does not carry streaming video traffic. A determination 1020 may be made whether streaming traffic carried by MPDU k is progressive download traffic. Congestion and priority based MAC-layer parameter adaptation 1030 may be performed, for example, when MPDU k does not carry progressive download traffic.

Retry limit, AIFS and CW parameters may be set at 1025 as Retry_limit(k)=m1, AIFSN(k)=A1 and CW_max(k)=C1, for example, when MPDU k carries progressive download traffic. In an example for progressive download traffic, retry limit(k)=m1=retry_limit_adapt+3, AIFSN(k)=A1=AIFSN_adapt−2, CW_max(k)=m1=CW_max_adapt/2, where retry_limit_adapt, AIFSN_adapt, CW_max_adapt may be the retry limit, AIFSN and CW of adaptive streaming, respectively.

Figure 11:
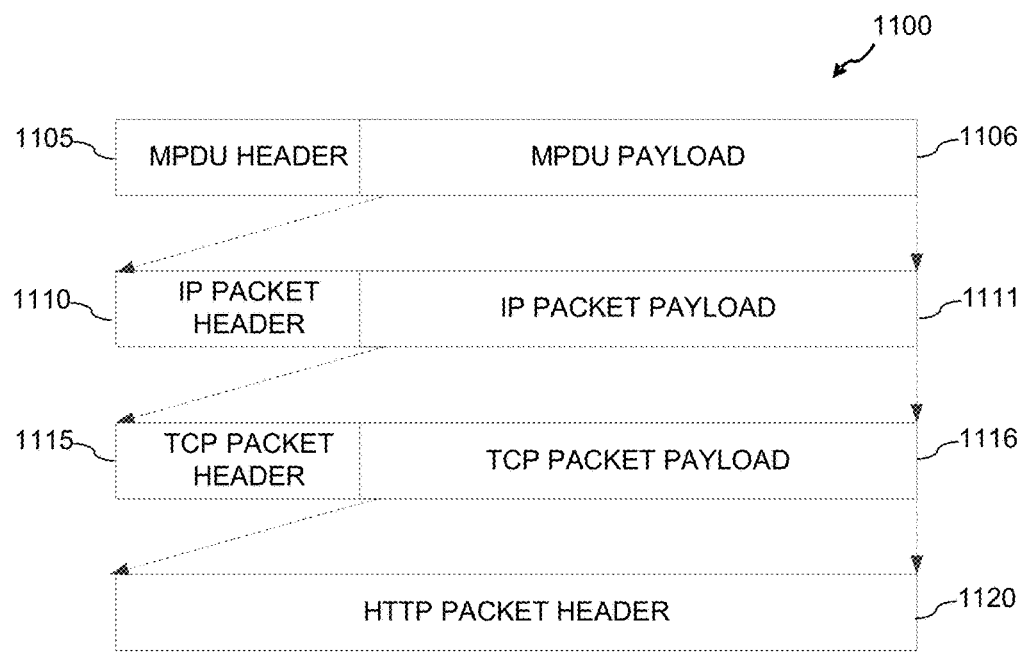
FIG. 11 illustrates an example of an MPDU packet.

FIG. 11 illustrates an example of an MPDU packet. MPDU packet 1100 may be analyzed, for example, when unencrypted HTTP messages are exchanged at the beginning of a video session to set up a media flow. This may allow for packet flow analysis at the MAC layer. At the MAC layer, an entity may inspect MPDU packet 1100, which may comprise MPDU header 1105 and MPDU payload 1106. MPDU payload 1106 may comprise IP packet header 1110 and IP packet payload 1111. IP packet payload 1111 may comprise TCP packet header 1115 and TCP packet payload 1116. TCP packet payload 1116 may comprise HTTP packet header 1120. A packet analysis may inspect the payload of an MPDU, the payload of an IP packet, and/or the payload of a TCP packet.

Figure 12:
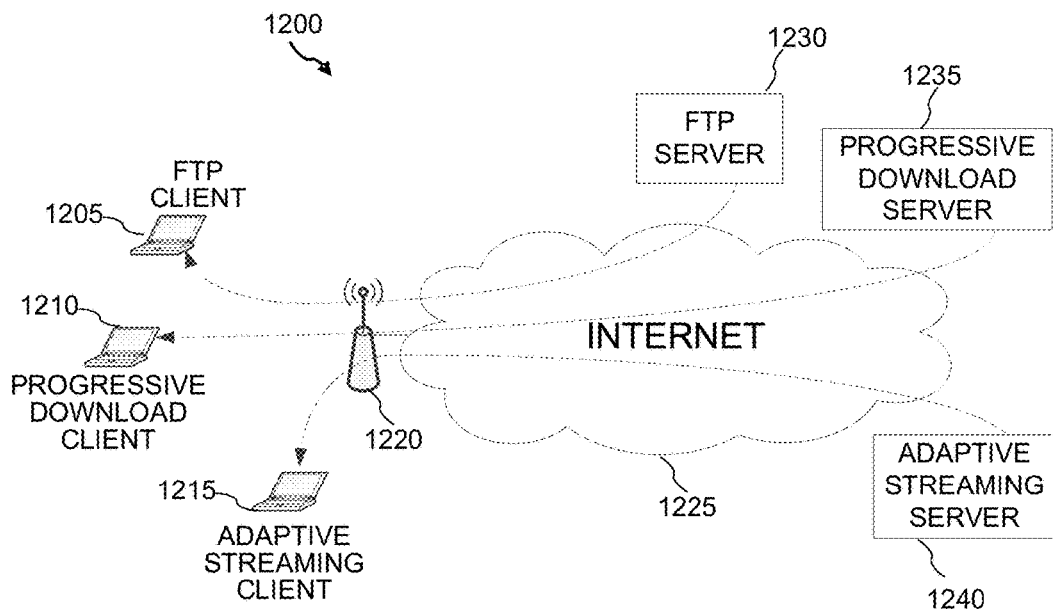
FIG. 12 illustrates an example communication system diagram.

FIG. 12 shows an example communication system diagram. Communication system 1200 comprises FTP client 1205, progressive download client 1210, adaptive streaming client 1215, AP 1220, Internet 1225, FTP server 1230, progressive download server 1235 and adaptive streaming server 1240. FTP server 1230 sends FTP traffic to FTP client through internet 1225 and AP 1220. Progressive download server 1235 sends progressive video traffic to progressive download client 1210 through Internet 1225 and AP 1220. Adaptive streaming server 1240 sends adaptive streaming video traffic to adaptive streaming client 1215 through Internet 1225 and AP 1220. AP 1220 may perform MPDU packet analyses for FTP, progressive video and adaptive streaming video traffic, for example, as shown in FIG. 11.

Figure 13:
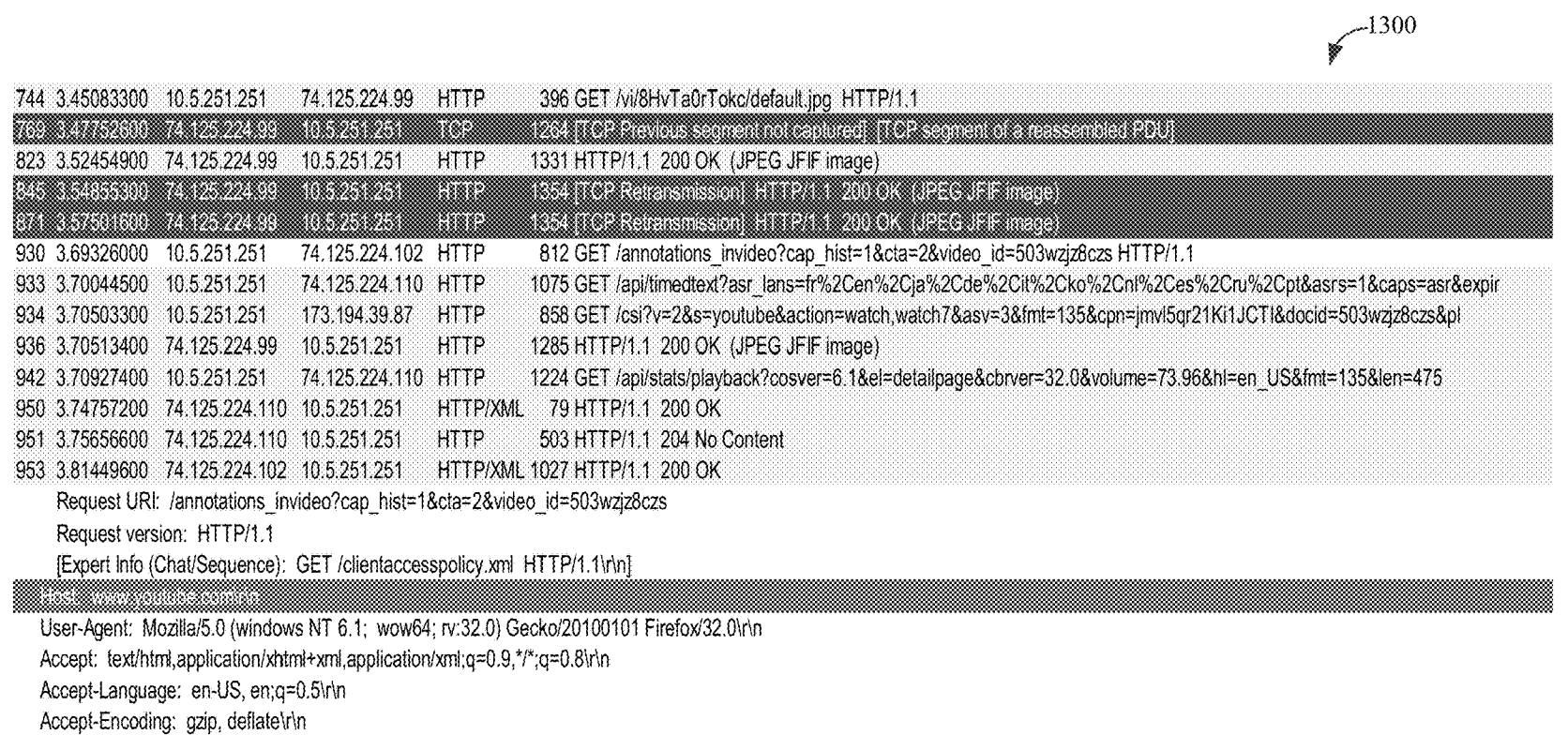

FIG. 13 shows an example of network protocol analyzer output. Network analyzer output 1300 shows the identification of a flow that may carry streaming video and the determination of the type of video streaming (e.g. progressive download or adaptive streaming) that the flow carries. The first column may indicate the packet number. For example, in packet number 930, the HTTP message may indicate that the host is www.youtube.com. From this, it may be determined that a local host with example IP address 10.5.251.251 may be sending a request to a YouTube server. It may further be determined that data destined to 10.5.251.251 may be progressive download video data from the YouTube server. It may be determined (e.g. alternatively) that the data flow destined to 10.5.251.251 may be adaptive streaming video data, for example, when YouTube servers use adaptive streaming for part or all of the video data that YouTube servers provide. FIG. 14 shows an example of network protocol analyzer output. Network analyzer output 1400 shows the identification of a flow that may carry streaming video and the determination of the type of video streaming (e.g. progressive download or adaptive streaming) that the flow carries. For example, videos hosted on Netflix may be transmitted using adaptive streaming. In the captured packets of output 1400, packet 2597 shows that a local host with IP address 192.168.2.2 requested a client access policy, which may be used by paid services such as Netflix.

FIG. 15 shows an example of network protocol analyzer output. Network analyzer output 1500 shows the identification of a flow that may carry streaming video and the determination of the type of video streaming (e.g. progressive download or adaptive streaming) that the flow carries. In network protocol analyzer output 1500, packet number 2600 destined to a local host with IP address 192.168.2.2 may be determined to contain information written in XML showing suggested URI's such as http://netfix.ca. This may indicate that the local host with IP address 192.168.2.2 may be requesting video streaming from Netflix.

FIG. 16 shows an example of network protocol analyzer output. Network analyzer output 1600 shows the identification of a flow that may carry streaming video and the determination of the type of video streaming (e.g. progressive download or adaptive streaming) that the flow carries. In network protocol analyzer output 2000, packet 2603 may confirm that the local host 192.168.2.2 is requesting video data, as may be indicated by the use of a GET HTTP message to request a particular segment of a large data object that may be video. The flow destined to 192.168.2.2 may be determined to carry adaptive streaming traffic, for example, because videos provided by Netflix may be based on adaptive streaming.

Figure 17:
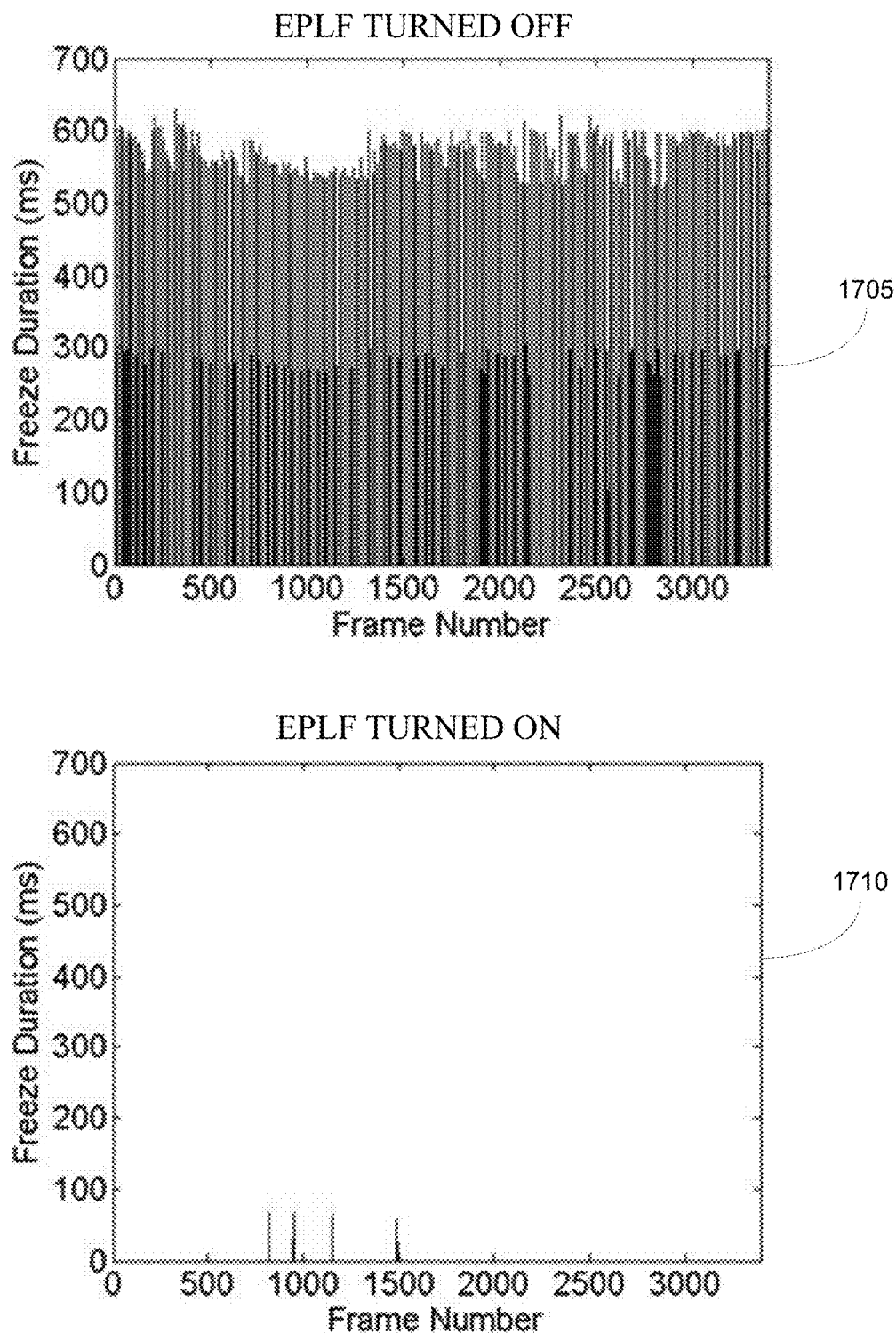

FIG. 17 shows plots comparing example results of freeze duration with EPLF turned off and turned on. Freeze duration results with early packet loss feedback (EPLF) turned off are indicated in plot 1705 while freeze duration results with EPLF turned on are indicated in plot 1710. FIG. 17 presents results for a controlled scenario.

In an example demonstrating the effects of the use of EPLF, an MPDU may be dropped from the 802.11n MAC layer once per second. In dropping the MPDU, it may be completely discarded and attempts to retransmit it may be prohibited. The RTT may be 600 ms. The average freeze time for the case where EPLF is off may be 571.28 ms, while the average freeze time for the case where EPLF is on may be 1.05 ms. Theoretical estimates may provide average freeze times of 606.96 ms and 0 ms, respectively. In arriving at the estimates, the average values of various parameters measured in the experiment may be substituted for the parameters used in equations (7), (8), (9), and (10). In an example when EPLF is off, $T_{playout}$=424.64 ms, d=12.65 ms, f=14.19 fps, and r=10 ms (as an upper bound rather than a measurement). The relative prediction error for the EPLF-off case may be 6.25%, and the absolute prediction error (1.05 ms) for the EPLF-on may be extremely small.

Figure 18:
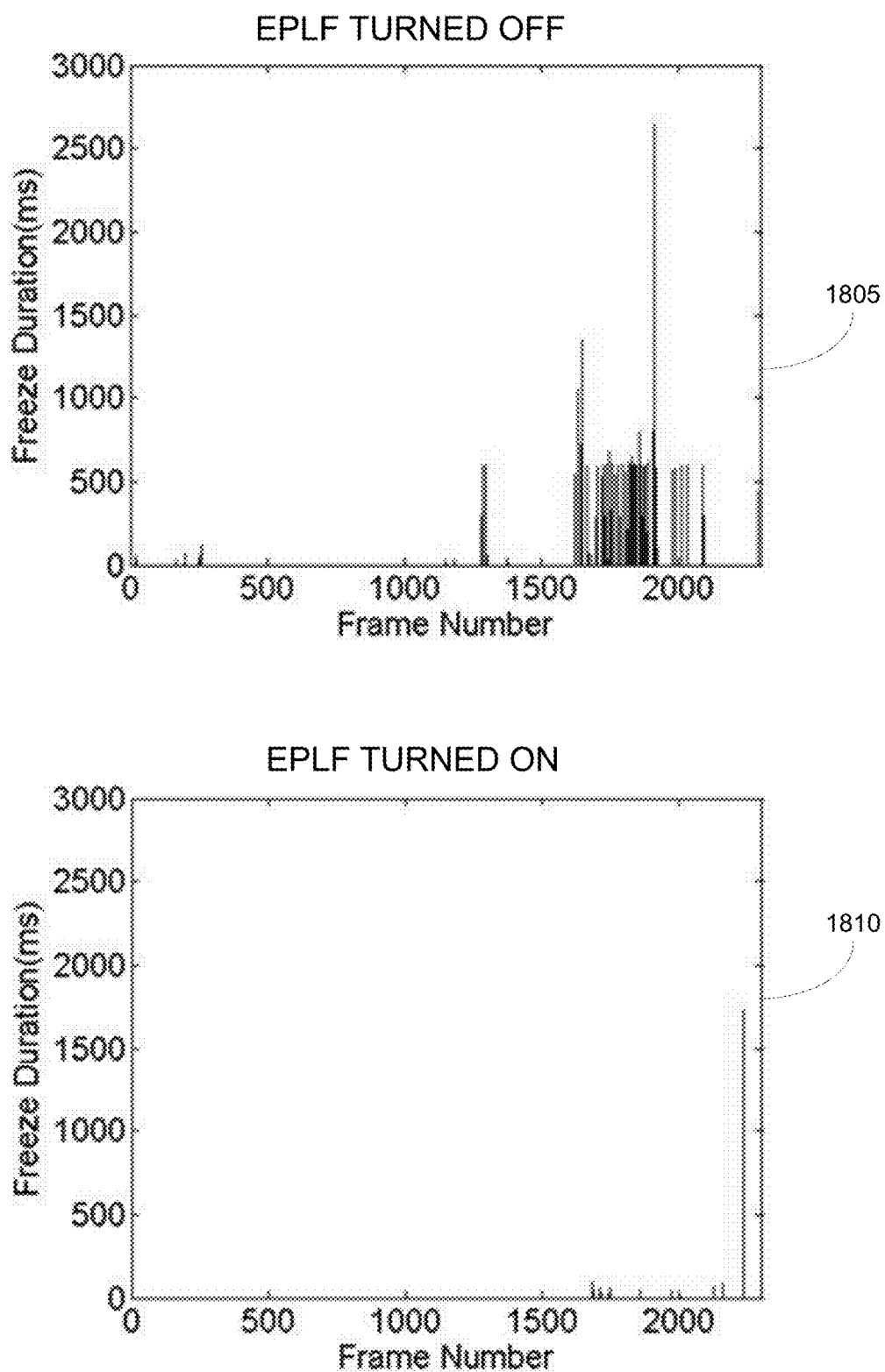

FIG. 18 shows plots comparing example results of freeze duration with EPLF turned off and turned on. Freeze duration results with EPLF turned off are indicated in plot 1805 while freeze duration results with EPLF turned on are indicated in plot 1810. FIG. 18 presents results for a realistic scenario.

In a realistic scenario, where the times at which a packet loss may happen are not controlled, packet losses may be caused, for example, by interference from a hidden terminal and/or WLAN congestion. Again using an example, non-limiting video scenario, a video sender, which may be running EPLF and may start a video call at time 0 seconds, may be a STA in a first WLAN with an access point (AP) with 15 competing STAs that start generating cross traffic at time 100 seconds. There may be a second WLAN consisting of an AP and a STA that may be a hidden terminal to the video sender. The hidden terminal may start transmission at time 120 seconds, causing appreciable packet losses and effectively reducing the capacity of the first WLAN, which may further trigger congestion. The parameters in a smoothed queue size equation, e.g., as disclosed herein, may be set to $\alpha=0.8$, $\beta=0.5$, Q=4 Mb.

As shown in a comparison of plots 1805 (EPLF OFF) and 1810 (EPLF ON), EPLF may substantially reduce or eliminate video freeze. Video freeze for the frame number over 2000 with EPLF ON may be a point at which the WLAN may be experiencing congestion and EPLF may not send a spoofed NACK to avoid disrupting congestion control. Similar results may be observed, for example. when using the disclosed subject matter with other types of video and non-video traffic. Video frames experiencing congestion in the case where EPLF is ON (plot 1810) may lag behind those in the case where EPLF is OFF (plot 1805) when accounting for frame numbers only. This may be due to EPLF's ability to hide channel-caused packet losses, in which case a congestion control algorithm may throttle less on the sending rate and, therefore, may deliver more frames in the case where EPLF is ON.

Figure 19:
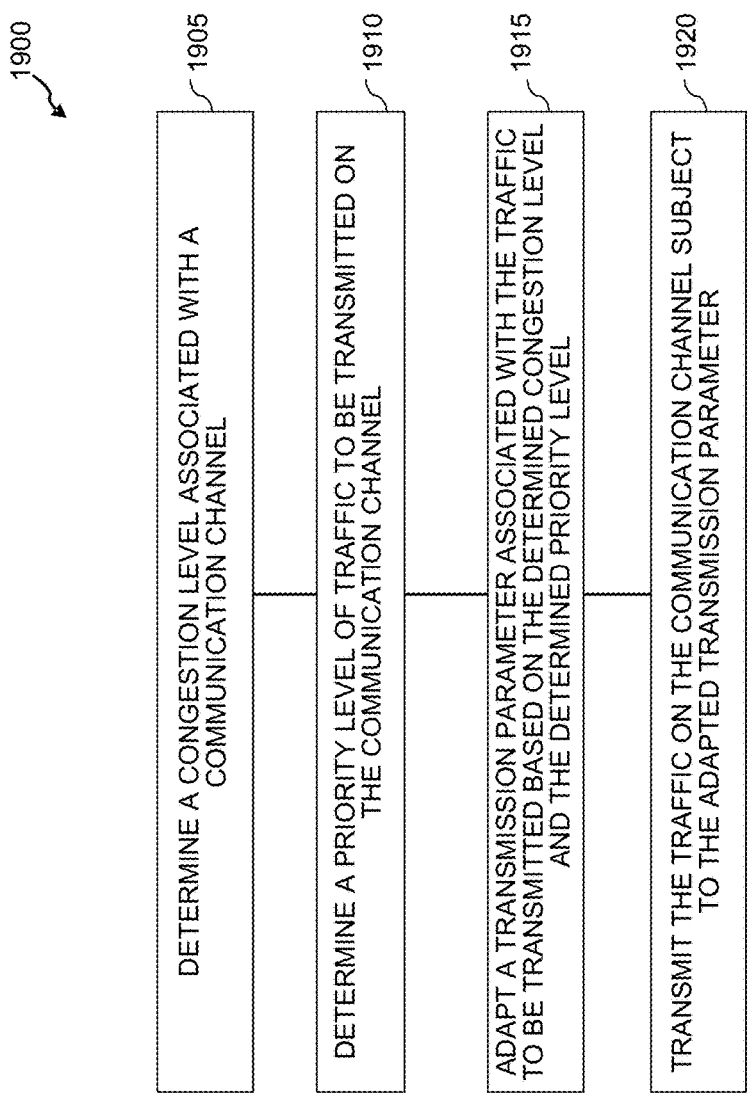
FIG. 19 illustrates an example communication parameter adaptation.

FIG. 19 illustrates an example communication parameter adaptation procedure. No order is required unless expressly indicated or inherently required. There is no requirement that all or part of example procedure 1900 be implemented. Example procedure 1900 is simply one of many possible procedures. Examples and embodiments may operate in accordance with part or all of example procedure 1900 and/or part or all of other parameter adaptation procedures. Other structural and operational examples and implementations will be apparent to persons skilled in the relevant art(s).

A congestion level associated with a communication channel, may be determined 1905. For example, as shown in an example in FIG. 6, congestion detection 605 may determine a congestion level and provide the determined level to parameter adapter 625.

A priority level of traffic to be transmitted on the communication channel may be determined 1910. For example, as shown in an example in FIG. 6, Traffic class 610 may determine a priority level for MPDU 1 and provide it to parameter adapter 625.

A transmission parameter associated with the traffic to be transmitted may be adapted 1915 based on the determined congestion level and the determined priority level. For example, as shown in an example in FIG. 6, parameter adapter 625 may adapt one or more of retry limit, AIFS, CW size, MCS order and CCA threshold transmission parameters based on a congestion level provided by congestion detection 605 and priority 1 provided by traffic class 610 for traffic to be transmitted MPDU 1.

The traffic may be transmitted 1920 on the communication channel subject to the adapted transmission parameter. For example, as shown in an example in FIG. 12, a sending or forwarding device, e.g., FTP server 1230, progressive download server 1235, adaptive streaming server 1240 and/or AP 1220 may transmit traffic to a receiver based on one or more parameters adapted to network or channel conditions (e.g. channel congestion levels, channel errors), traffic types and/or traffic priority levels.

Systems and methods have been provided for adapting communication parameters to a variety of link conditions, traffic types and priorities. For example, WiFi transmission parameters (e.g. retry limit, AIFS, CW size, MCS order and/or CCA threshold) may be adapted to channel congestion levels, channel errors and/or traffic priority levels. Parameter adaptation may be coordinated across layers (e.g. between MAC and PHY layer parameters). Congestion levels may be detected, for example, using a smoothed queue size and/or channel busy time. Traffic may be transmitted using adapted parameters, such as reduced retry limits for a high congestion level and increased retry limits for priority traffic in response to channel error. Feedback may support parameter adaptation. For example, feedback may be provided by a receiver and/or within a sender, such as a sender MAC and/or PHY layer or a parameter adapter providing feedback (e.g. spoofed NACK packet) to a sender application, transport and/or network layer.

The disclosed systems and methods may be used to improve the performance of all types of traffic over Wi-Fi networks. While the instant disclosure often uses WebRTC-based mobile video telephony and other video applications as examples that may benefit from the disclosed systems and methods, the disclosed systems and methods are not limited to such applications. As shown herein, the disclosed systems and methods may reduce or eliminate the effects of channel errors while improving congestion control, thereby improving the end user experience and the efficient use of network and device resources.

The processes and instrumentalities and each feature and element described herein may be implemented alone or in any combination, may be implemented in or with other wireless technologies, and for other services.

The processes and instrumentalities described herein may be implemented in hardware (digital and/or analog), software and/or firmware, including computer program products (e.g. computer readable media) comprising logic stored on any discrete or integrated computer readable medium(s) having computer executable instructions that, when executed by one or more processors, provide and/or maintain one or more aspects of functionality described herein. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

Proper interpretation of subject matter described herein and claimed hereunder is limited to patentable subject matter under 35 U.S.C. § 101. As described herein and claimed hereunder, a procedure is a process defined by 35 U.S.C. § 101 and each of a circuit, device, apparatus, machine, system, computer, module, media and the like is a machine and/or manufacture defined by 35 U.S.C. § 101.

What is claimed is:

1. A communication device comprising:
   a memory; and
   a processor configured to:
   determine a congestion level associated with a communication channel;
   determine a priority level associated with a packet to be transmitted on the communication channel, wherein the priority level is determined based on a traffic classification associated with the packet;

jointly adapt a PHY layer transmission parameter and a MAC layer transmission parameter based on the determined congestion level and the determined priority level; and transmit the packet using the jointly adapted MAC layer transmission parameter at a MAC layer of the communication device and the jointly adapted PHY layer transmission parameter at a PHY layer of the communication device.

2. The communication device of claim 1, wherein the jointly adapted PHY layer transmission parameter is an MCS order or a clear channel assessment (CCA) threshold.

3. The communication device of claim 1, wherein the jointly adapted MAC layer transmission parameter is a retry limit, an arbitration interframe space (AIFS), or a contention window (CW) size.

4. The communication device of claim 1, wherein the congestion level is determined via a channel busy time fraction (CBTF), wherein the CBTF is a fraction of time during which the communication channel is busy within a time interval.

5. The communication device of claim 1, wherein the processor is further configured to determine if the packet is associated with streaming video traffic.

6. The communication device of claim 5, wherein the processor is further configured to determine, if the packet is associated with streaming video traffic, whether the streaming video traffic is progressive download traffic or adaptive streaming traffic.

7. A method implemented in a communication device, the method comprising:

determining a congestion level associated with a communication channel;

determining a priority level associated with a packet to be transmitted on the communication channel, wherein the priority level is determined based on a traffic classification associated with the packet;

jointly adapting a PHY layer transmission parameter and a MAC layer transmission parameter based on the determined congestion level and the determined priority level; and transmitting the packet using the jointly adapted MAC layer transmission parameter at a MAC layer of the communication device and the jointly adapted PHY layer transmission parameter at a PHY layer of the communication device.

8. The method of claim 7, wherein the jointly adapted PHY layer transmission parameter is an MCS order or a clear channel assessment (CCA) threshold.

9. The method of claim 7, wherein the jointly adapted MAC layer transmission parameter is a retry limit, an arbitration interframe space (AIFS), or a contention window (CW) size.

10. The method of claim 7, wherein the congestion level is determined via a channel busy time fraction (CBTF), wherein the CBTF is a fraction of time during which the communication channel is busy within a time interval.

11. The method of claim 7, wherein the method further comprises determining if the packet is associated with streaming video traffic.

12. The method of claim 11, wherein the method further comprises determining, if the packet is associated with streaming video traffic, whether the streaming video traffic is progressive download traffic or adaptive streaming traffic.

* * * * *